(12) United States Patent
Gupta et al.

(10) Patent No.: US 11,531,803 B1
(45) Date of Patent: Dec. 20, 2022

(54) IPBA-DRIVEN FULL-DEPTH EPBA OF OPERATIONAL TIMING FOR CIRCUIT DESIGN

(71) Applicant: Cadence Design Systems, Inc., San Jose, CA (US)

(72) Inventors: Umesh Gupta, Noida (IN); Naresh Kumar, Noida (IN); Marut Agarwal, Ghaziabad (IN); Rakesh Agarwal, Delhi (IN)

(73) Assignee: CADENCE DESIGN SYSTEMS, INC., San Jose, CA (US)

( * ) Notice: Subject to any disclaimer, the term of this patent is extended or adjusted under 35 U.S.C. 154(b) by 25 days.

(21) Appl. No.: 17/232,616

(22) Filed: Apr. 16, 2021

(51) Int. Cl.
*G06F 30/398* (2020.01)
*G06F 119/12* (2020.01)

(52) U.S. Cl.
CPC ........ *G06F 30/398* (2020.01); *G06F 2119/12* (2020.01)

(58) Field of Classification Search
CPC .............. G06F 2211/005; G06F 17/18; G06F 16/2379; G06F 16/245; G06F 30/3312; G06F 30/39; G06F 16/24578; G06F 16/254; G06F 16/284; G06F 16/444; G06F 16/9024; G06F 3/0482; G06F 3/0484; G06F 3/04842; G06F 3/04847; G06F 40/134; G06F 2219/12; G06F 30/30; G06F 30/394; G06F 2119/06; G06F 30/327; G06F 30/33; G06F 30/392; G06F 21/57; G06F 21/604; G06F 2111/04; G06F 2221/034; G06F 2221/2141; G06F 30/3323; G06F 30/367; G06F 30/398; G06F 1/324; G06F 1/3296; G06F 2111/08; G06F 21/554; G06F 30/20; G06F 30/34; G06F 11/261; G06F 11/3457; G06F 11/3664; G06F 11/3668; G06F 11/3672; G06F 16/00; G06F 2009/45562; G06F 2009/45587; G06F 2009/45595; G06F 21/44; G06F 21/53; G06F 21/563;

(Continued)

(56) References Cited

U.S. PATENT DOCUMENTS 8,875,082 B1 * 10/2014 Sircar .................... G06F 30/39
716/132
9,760,672 B1 * 9/2017 Taneja .................... G06F 30/39
(Continued)

*Primary Examiner* — Binh C Tat
(74) *Attorney, Agent, or Firm* — Tarolli, Sundheim, Covell & Tummino LLP

(57) ABSTRACT

A static timing analysis system for finding and reporting timing violations in a digital circuit design prior to circuit fabrication, and associated methods, use exhaustive path-based analysis (EPBA) that is informed by infinite-depth path-based analysis (IPBA) to provide analysis results that are driven full-depth, in contrast to conventional EPBA systems and methods, which can terminate after reaching a maximum depth of analysis as a way of avoiding prolonged or infinite runtimes. The IPBA-driven full-depth EPBA functions for hold-mode as well as setup-mode analysis and achieves reduced pessimism as compared to systems or methods employing IPBA alone, and more complete analysis of designs as compared to systems or methods employing EPBA alone. Improved IPBA signal merging using multi-dimensional zones for thresholding of signal clustering mitigates the occasional optimism of IPBA.

18 Claims, 17 Drawing Sheets

(58) Field of Classification Search
CPC ........ G06F 21/566; G06F 21/79; G06F 21/86;
G06F 2111/20; G06F 2117/02; G06F
2221/2129; G06F 2221/2143; G06F 8/00;
G06F 8/60; G06F 9/30072; G06F 9/3834;
G06F 9/3838; G06F 9/3842; G06F
9/3851; G06F 9/3861; G06F 9/3885;
G06F 9/45558; G06F 1/08; G06F 1/1626;
G06F 11/263; G06F 12/0866; G06F
16/242; G06F 16/248; G06F 17/40; G06F
2117/04; G06F 2119/10; G06F
2212/2022; G06F 3/14; G01M 13/045;
G06Q 50/04; G06Q 50/08; H04L 43/045;
H04L 47/122; H04L 12/66; H04L 1/0076;
H04L 1/0057; H04L 1/1874; H01L
27/118; H01L 27/0207; H01L 23/576
USPC .................................................. 716/110–117
See application file for complete search history.

(56) References Cited

U.S. PATENT DOCUMENTS 10,776,547 B1    9/2020  Gupta et al.
2016/0217245 A1*  7/2016  Gregerson ............ G06F 30/398

\* cited by examiner

MAX SLACK = 0.000

MAX SLACK = 0.010

IPBA-DRIVEN FULL-DEPTH EPBA OF OPERATIONAL TIMING FOR CIRCUIT DESIGN

TECHNICAL FIELD

The present invention relates generally to electronic design automation (EDA) tools and techniques, and specifically to full-depth exhaustive path-based analysis (PBA) of operational timing for circuit design that is driven by infinite-depth PBA.

BACKGROUND

Electronic design automation (EDA) uses software tools for design and analysis of complex digital electronic systems such as printed circuit boards (PCBs) and integrated circuits (ICs). So as to ensure correct operability of a complicated digital electronic circuit design before significant investment is committed in the physical fabrication of chips or boards that use the design, and thus to avoid substantial waste and retooling, prior to fabrication of the design, a design can be required to pass a series of verification tests collectively referred to as "signoff." Signoff is accomplished in part by the performance of static timing analyses (STA), used in EDA tools to assess the timing of a digital circuit design, generally using software techniques and models that yield operational timing characteristics of the digital circuit design to discover, and thereby to correct through design modification, timing violations in a circuit being analyzed. Because design optimization to fix detected violations following STA frequently results in creating more violations, signoff typically involves numerous repeated iterations of remedial transformations of the circuit design. The use of pessimistic timing characteristics in STA disadvantageously results in false-positive violations, requiring costly over-fixing and wastefully increasing turnaround time, which in turn fails to minimize fabricated circuit product cost, time to market, power requirements, and substrate area, while maximizing circuit performance.

STA generally includes a plurality of different static timing analysis methodologies variously performing different algorithmic checks on the circuit design with attendant accuracy versus runtime tradeoffs for each. Examples of STA analyses include graph-based analysis (GBA), which performs timing analysis on a node-by-node level, traversing exhaustively throughout the circuit design, and path-based analysis (PBA), which performs algorithmic checks on the circuit design that are less pessimistic than with GBA in that they do not incorporate the same worst-case-scenario assumptions, and thereby do not result in generating the same false-positive violations. PBA requires greater runtime, memory footprint, storage footprint, and processing resources than GBA. Accordingly, GBA is generally used as a coarse filter to approve timing paths that clearly do not have timing violations, and PBA is subsequently used only on the unapproved timing paths, as a slower but finer filter to further winnow out timing paths incorrectly detected by GBA as containing violations.

GBA generates a timing graph for a given netlist and then computes the worst arrival and required times on the nodes of the graph. For nodes that are sinks of a timing path, it also computes the worst slack, slack being the difference between a desired arrival time (as defined by the constraints; usually, synchronized with the arrival time of a second signal) and the actual arrival time of a signal propagated through a given path of the circuit design as defined by the netlist and other parameters. In doing so, worst-case timing paths in the circuit design are determined. GBA identifies timing paths with apparent timing violations, where the computed timing is not within the margins allowed by the constraints. GBA makes certain pessimistic assumptions about the behavior of each stage. For example, it may assume the input slew, the time it takes a signal to "ramp up" from "off" to "on," or "ramp down" from "on" to "off," to be at its worst for each gate within a timing path. Such pessimistic assumptions allow GBA computations to operate comparatively quickly, but at the cost of sometimes reporting a "false" timing violation where a more exact analysis would have shown that the timing path meets the constraints.

Conventionally, PBA has been implemented as exhaustive PBA (EPBA), which peels a set of paths in non-increasing order of criticality and applies path-specific timing update to each of these paths. Path peeling, the process of determining paths between start points and endpoints in a network graph of a digital design (see FIG. 4 for a simplified example), is a computationally expensive process. By analyzing the path with reduced pessimism, many timing violations can be waived, which in turn tells better timing signoff. Aside from this peeling, EPBA otherwise performs similar computations to GBA, but takes into account the input slew and other variables that would actually be encountered in a timing path, rather than simply assuming the worst case slew of all inputs, as GBA pessimistically would. These more complex computations take considerably longer than those of GBA, and if applied to all paths in the circuit can require an unfeasible amount of runtime and processing power to approach completion. Performing GBA and PBA successively can return first a coarse timing report indicative of a GBA-violating zone, whereafter only timing paths with apparent timing violations according to GBA are re-analyzed under PBA, without the pessimism of GBA, to potentially determine that timing paths with apparent timing violations (as determined by GBA) do not, in fact, violate the provided constraints, and therefore do not require redesign, through what is known as an engineering change order (ECO).

When used on designs having re-convergent logic, EPBA, which uses a depth-first search (DFS) traversal of a design's timing graph, can require long or even infinite runtimes to complete. Consequently, EPBA may not be able to be run "full depth" (may not be able to evaluate all violating paths to GB A-violating endpoints), particularly for complex designs having highly re-convergent logic driving one or more endpoints. In contrast, infinite-depth path-based analysis (IPBA), as described in U.S. Pat. No. 10,776,547 B1, which is herein incorporated by reference, can be used to achieve reduced pessimism versus GBA, but with greatly reduced compute time requirements, or greater logic path coverage, versus EPBA. IPBA achieves improved coverage or compute time results by slotting nodes of a circuit design graph into stages, propagating phases stage-by-stage for all paths in parallel using a breadth-first search (BFS) graph traversal technique, and merging phases wherever possible during the analysis, at or downstream of stages in the graph where signals join, according to defined merging criteria.

SUMMARY

One example includes a method for detecting timing violations in a circuit design. An exhaustive path-based analysis (EPBA) is executed with at least one processor coupled to a memory storing physical implementation data for the circuit design. The circuit design has a plurality of timing paths, each path proceeding between a begin point for the path and an endpoint for the path, and each path having at least one node thereon. The executing the EPBA computes timings along EPBA paths comprising at least a subset of the timing paths in the circuit design. At least a subset of the EPBA paths, for which the EPBA paths lead to endpoints not converged by the EPBA, are bounded by slacks computed by an infinite-depth path-based analysis (IPBA). Results of the EPBA are reported, including arrival times at endpoints analyzed by the EPBA and, at least for each such endpoint not converged by the EPBA, at least one worst EPBA path leading to the corresponding endpoint, as bounded by the IPBA slacks.

Another example includes a system for detecting timing violations in a circuit design. The system includes at least one processor coupled to a memory storing physical implementation data for the circuit design having a plurality of timing paths, each path proceeding between a begin point for the path and an endpoint for the path, and each path having at least one node thereon. The system further includes an exhaustive path-based static timing analyzer configured to perform EPBA by computing timings along EPBA paths comprising at least a subset of the timing paths in the circuit design. The system further includes an infinite-depth path-based static timing analyzer configured to perform IPBA of the circuit design, and configured to bound at least a subset of the EPBA paths, for which the EPBA paths lead to endpoints not converged by the exhaustive path-based static timing analyzer, by slacks computed by the infinite-depth path-based static timing analyzer. The system further includes a report generator configured to report results of the EPBA, including arrival times at endpoints analyzed by the exhaustive path-based static timing analyzer and, at least for each such endpoint not converged by the EPBA, at least one worst EPBA path leading to the corresponding endpoint, as bounded by the IPBA slacks.

Yet other examples include one or more computer-readable media configured to provide a computer as the system set forth above, or to execute in conjunction with a computer the method set forth above. For example, a non-transitory computer-readable medium can store instructions that, when executed on one or more processors, substantially contemporaneously perform both EPBA and IPBA to analyze physical implementation data for a circuit design having a plurality of timing paths, each path proceeding between a begin point for the path and an endpoint for the path, and each path having at least one node thereon. The EPBA computes timings along EPBA paths comprising at least a subset of the timing paths in the circuit design. At least a subset of the EPBA paths, for which the EPBA paths lead to endpoints not converged by the EPBA, are bounded, according to the instructions, by slacks computed by the IPBA. Results of the EPBA are reported according to the instructions. The results include arrival times at endpoints analyzed by the EPBA and, at least for each such endpoint not converged by the EPBA, at least one worst EPBA path leading to the corresponding endpoint, as bounded by the IPBA slacks.

BRIEF DESCRIPTION OF THE DRAWINGS

FIG. 17B expands on the IPBA graph creation of FIG. 17A.

FIG. 17C expands on the EPBA of FIG. 17A.

DETAILED DESCRIPTION

Figure 1:
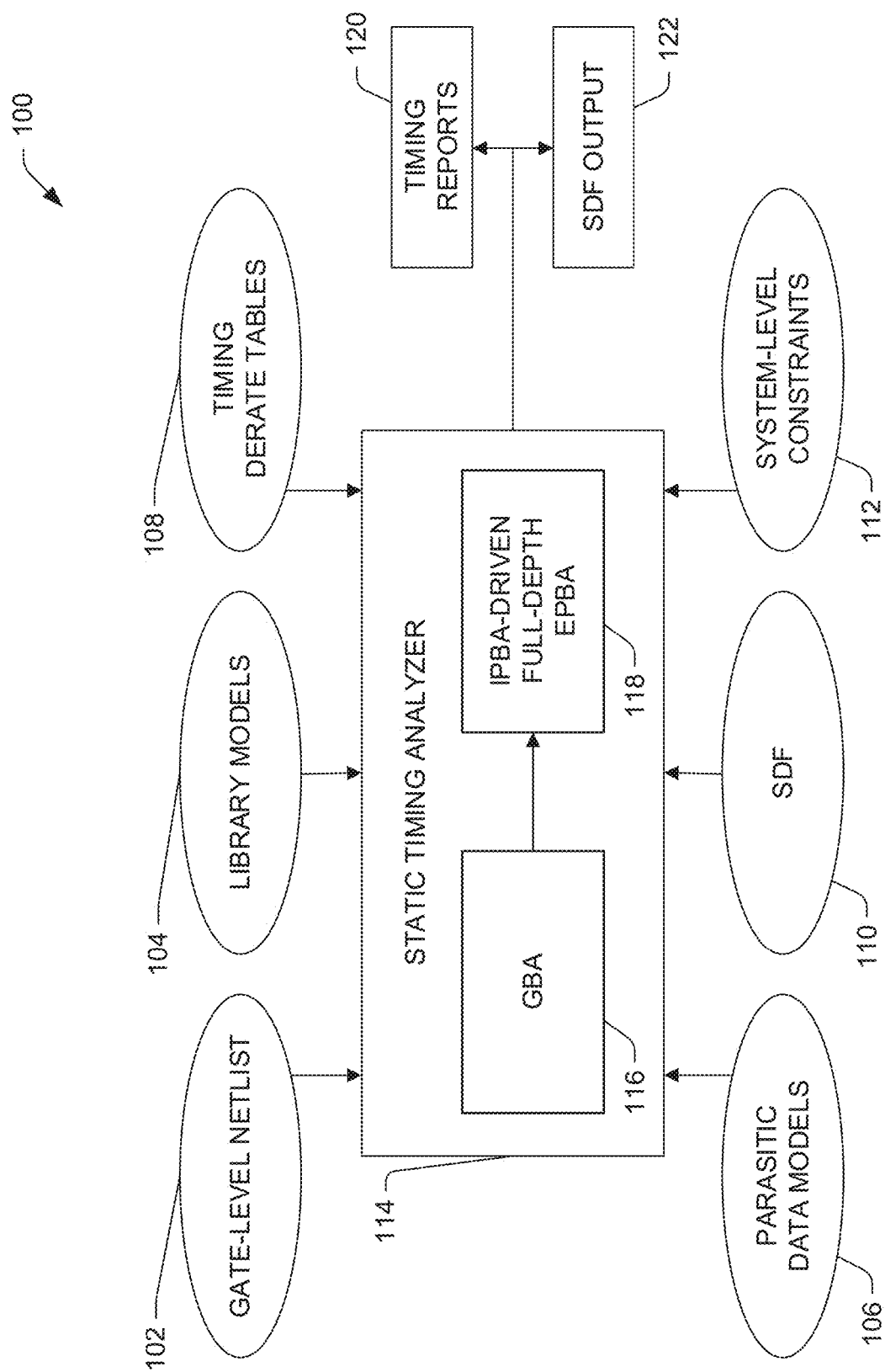
FIG. 1 is a block diagram of an example system for static timing analysis using exhaustive path-based analysis that is driven to full depth using infinite-depth path-based analysis.

FIG. 1 illustrates a system 100 for IPBA-driven full-depth exhaustive path-based analysis of operational timing for a digital circuit design undergoing signoff. The system 100 defines the design to be analyzed through a number of inputs 102-112 to a static timing analyzer 114. One or more of the inputs 102-112 together form a model of the analyzed circuit for analyzer 114 to test the timing on, thereby providing outputs 120, 122. Analyzer 114 can include any number of different components for providing the desired timing testing of the design, including but not limited to a graph-based analyzer 116 and an IPBA-driven full-depth exhaustive path-based analyzer 118, as described in greater detail below. Static timing analyzer 114 may be implemented as either software or as specialized computing hardware (e.g., as a custom IC or ASIC). For example, static timing analyzer 114 may be integrated into an electronic design automation (EDA) tool.

Static timing analyzer 114 can be executed using one or more computer processors, which may be local computer processors and/or one or more cloud computing resources or other networked computing resources. As one example, static timing analyzer 114 can be executed using a single local computer system having a memory for storing the static timing analyzer 114 as executable code and for storing data elements for inputs 102-112 and outputs 120, 122; one or more processor configured to execute the static timing analyzer 114; and interface elements such as a display configured to provide a user interface, which may be a graphical user interface (GUI), to a human user. As another example, static timing analyzer 114 can be executed using one or more networked computer systems accessed via a local computer system configured to serve as a user terminal or client computing device. In such an example, the processor and memory functions can be distributed among the networked computer systems and/or the local computer system, and the local computer system provides the user interface. As yet another example, static timing analyzer 114 can be executed using a plurality of networked computer systems configured as one or more cloud computing resources accessed via a local computer system configured to serve as a user terminal. In such an example, the processor and memory functions can be distributed among the networked computer systems in the cloud and/or the local computer system, and the local computer system provides the user interface. A network may connect various computing devices with databases or other components of the one or more networked computer systems. Examples of the network include a local area network (LAN), a wireless local area network (WLAN), a metropolitan area network (MAN), a wide area network (WAN), and the Internet. The communication over the network may be performed in accordance with various communication protocols, such as Transmission Control Protocol and Internet Protocol (TCP/IP), User Datagram Protocol (IMP), and IEEE communication protocols.

A client device may be any computing device comprising a processor/microcontroller and/or any other electronic component that performs one or more operations according to one or more programming instructions. Examples of the computing device may include a desktop computer, a laptop, a personal digital assistant (PDA), a smartphone, and a tablet computer. The client device may be configured to communicate with one or more servers through one or more networks, using wired and/or wireless communication capabilities. A GUI provided by a client device may render an interactive, graphical representation of an IC and/or PCB design, layout, schematic, or other logical representation of an IC that is being designed and optimized using an EDA tool. In some examples, the user interface may include a text-based interface allowing a user to enter manual commands for designing and optimizing the IC and/or PCB.

A server may be accessible to the client device via one or more networks. The server may be any computing device comprising a processor and other computing hardware configured to execute an EDA software module that may analyze and optimize a design. In operation, using a client device to access an EDA tool hosted on a server over a network, a user may interact with the EDA tool, through a number of input devices of the client device, such as by inputting a selection as with a mouse or inputting a request as with a keyboard. The EDA tool may generate any number of GUI responses based on the inputs received from the client device, and then send the data back to the client device to be rendered on the GUI.

One or more servers may execute one or more component software modules of the EDA tool software program, which may be a software program that allows users (e.g., engineers, circuit designers) to design and optimize circuit designs through software modules. The EDA tool may provide users with interactive design interfaces for designing an IC and/or PCB and the various design elements, execute automated optimization processes, and execute automated layout-generation processes. The one or more servers may comprise, or may be in networked communication with, non-transitory machine-readable media configured to store a netlist of or any other file including records of IC and/or PCB design elements, which may be a machine-readable computer file or a design database containing one or more records of design elements (e.g., circuit devices, pcells) of the IC and/or PCB design. In operation, the EDA tool may analyze and optimize the design elements of the netlist or any other type of file associated with the IC and/or PCB design. Non-limiting examples of circuit devices may include memory devices (e.g., flip-flops, registers), combination logic gates (e.g., AND, OR, NOT, NOR, NAND, XOR), and multiplexers, among others. The netlist or any other type of file may also include records of a plurality of nets. The nets may be the records associated with the wires interconnecting the plurality of circuit devices.

Timing analysis may, for example, employ simulated propagation of a waveform through the digital circuit design on the basis of the various structural and functional definitions and constraints provided by inputs 102-112. A waveform is a time series of values representative of voltages as can be applied at various inputs of the digital circuit design and thereby propagated through the paths of the circuit.

A gate-level netlist 102 can be provided as a model input to define the topology and desired functionality of the circuit design. Various kinds of library models 104 may be required to perform static timing analysis. As examples, Liberty-format-specified .lib library models define delays of standard digital gates (AND, OR, NOT, flip-flop, latch, etc.) and macros; Advanced On-Chip Variation (AOCV) models can be used for performing advanced static timing analysis; and Cadence Data Base (CDB) models can be used for performing signal integrity (SI) analysis. Parasitic data models 106, for example, those specified in the Standard Parasitic Exchange Format (SPEF), represent parasitics (e.g., parasitic capacitances and parasitic resistances) of interconnects (e.g., wires) in a chip. Timing derate tables 108, providing values referred to as "timing derates," characterize variation in signal propagation delay through a logic cell as a function of one or more contributors to propagation delay variability between different chips, between different areas on a chip, or between chips of the same design that are produced or operated at different times or under different conditions. Timing derates can be applied as multipliers to calculated propagation delay values, which can be added to input arrivals to get new arrival times. Thus, for example, a calculated delay of 100 time units might be multiplied by a timing derate of 1.2 to produce a derated delay of 120 time units. Timing derates can be based on, or modified by, factors such as spatial information, for example, the chip area consumed by simulated portions of a digital design. Input from a Standard Delay Format (SDF) file 110 SDF can provide cell delays and estimated interconnect delays used for static timing analysis. A set of system-level constraints 112 define the desired timing that is envisioned from the digital circuit under consideration.

The results produced by the static timing analyzer 114 can include timing reports 120, which can point out the locations of violations in paths, and an SDF file 122, as a tool-independent way of storing the generated timing data, which can include one or more of module path, device, interconnect, and port delays; setup, hold, recovery, removal, skew, width, period, and nochange timing checks; path, skew, period, sum, and diff timing constraints; the information related to the intended operating timing environment; incremental and absolute delays; conditional and unconditional module path delays and timing checks; design/instance-specific or type/library-specific data; and scaling, environmental, and technology parameters. Timing reports 120 can separate the analyzed circuit design into a number of signal flow paths, which are subsections of digital circuits in the design, and then state whether each path meets the set constraints 112.

Static timing analyzer 114 can read-in the various inputs 102-112 defining the circuit design testing model and can build a persistent model of static timing analysis by creating a timing graph for the given netlist 102. Then, using, e.g., graph-based analyzer 116, static timing analyzer 114 can compute the worst arrival and required times on the nodes of the graph. For certain nodes characterized as endpoints, it can also compute the worst slack.

IPBA-driven full-depth exhaustive path-based analyzer 118 can serve as an extension to graph-based analyzer 116 and can be used to target pessimism reduction (and also optimism, in certain cases where GBA cannot cater to the requirements like waveform propagation due to compute and resource-intensive tasks) that has been introduced at various stages of the graph-based analysis performed by graph-based analyzer 116. Various types of pessimism introduced during GBA include slew merging pessimism, impacting delay computation on the timing network; graph-based derating factors (advanced on-chip-variation factors); and signal integrity (SI) effects. IPBA-driven full-depth exhaustive path-based analyzer 118 can provide advantages and benefits over the use of an infinite-depth path-based analyzer, as described in greater detail below, while also providing fuller coverage and/or faster completion times than a conventional exhaustive path-based analyzer.

Figure 2:
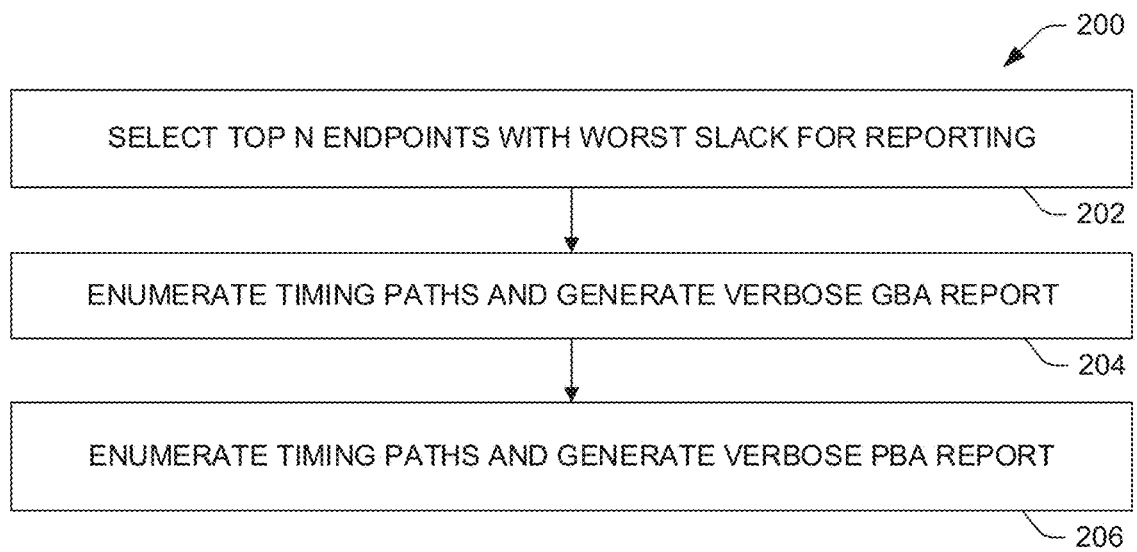
FIG. 2 is a flowchart illustrating a method of timing analysis.

The generation of timing reports by static timing analyzer 114 in PBA is described at a high level by flow diagram 200 of FIG. 2. The analyzer selects 202 the top N endpoints with the worst slack (N being an integer) for reporting. Then, the analyzer enumerates 204 timing paths and generates a verbose GBA report, e.g., using graph-based analyzer 116. Then, the analyzer enumerates 206 the timing paths and generates a verbose PBA report, e.g., using IPBA-driven full-depth exhaustive path-based analyzer 118.

IPBA-driven full-depth exhaustive path-based analyzer 118 can perform an analysis that combines IPBA and EPBA such that the two types of analyses are both performed, in parallel with each other and interactive with each other, as described in greater detail below. IPBA can differ from EPBA in a number of respects. EPBA aims at exhaustively covering all timing paths in the design during PBA. The goal of either IPBA or EPBA is to discover timing violations so that they can be corrected with redesign of the digital circuit prior to fabrication, but to avoid "overfixing" by not redesigning to correct false-positive violations as may have been detected by GBA. Definition of a variety of terms can assist in aiding discussion of the differences between EPBA and IPBA.

A failing endpoint, also referred to as a violating endpoint, is an endpoint to at least one path indicated by GBA or PBA as having a failing slack based on the defined violating boundary value. The worst GBA timing slack on an endpoint is referred to as the GBA endpoint slack for that endpoint, implying that there exists at least one GBA path ending at that endpoint having a GBA slack equal to the GBA endpoint slack for that endpoint, and that all other paths ending at that endpoint have a GBA path slack that is either equal to or better than the available GBA endpoint slack, but not worse than that of the GBA endpoint slack for that endpoint.

The PBA timing slack of an endpoint is referred to as the retimed endpoint slack or the PBA endpoint slack. PBA endpoint slack implies that there exists at least one PBA path ending at an endpoint having a PBA slack equal to the PBA endpoint slack of the endpoint. The PBA endpoint slack may not be the worst PBA slack available on that endpoint, if all the paths ending at that endpoint have not been exhausted in the path-based analysis, and there remain more paths, yet unanalyzed, which may have a worse slack beneath the given path ending at that endpoint. However, if all paths ending at the given endpoint have been analyzed using PBA such that there remain no unanalyzed paths ending at that endpoint, the true worst PBA endpoint slack can be expected to have been determined by the PBA, which is to say that all paths ending at the given endpoint will have a PBA path slack that is either equal to or better than the PBA endpoint slack for that endpoint.

Conventional "exhaustive" PBA may not be truly exhaustive in that it may not analyze every path in a design. For example, EPBA may be configured such that it looks at each violating endpoint and analyzes only a certain number N of the worst GBA paths ending at a given endpoint among the violating endpoints. The integer value N is called the "Nworst depth search limit," which defines the maximum depth of paths per endpoint picked for PBA analysis. Moreover, EPBA may be configured such that it performs PBA evaluation only on a certain number of M of the worst GBA paths in the entire design. The integer value M is called the "max paths search limit," which defines the maximum search radius in terms of the maximum total number of paths picked for PBA analysis.

Clock signals and the data signals corresponding to every clock that can be stored and propagated by the static timing analyzer 114 may be termed as phases. These phases may include clock phases and data phases (corresponding to every clock). A "phase" can be thought of as a container for waveforms, slew values ("slews"), arrival times ("arrivals"), and delay times ("delays") for a particular signal. When, in the timing analysis, multiple signals are propagated through multiple paths, these values for any particular signal can be collectively referred to as the "phase" of that signal. Thus, for example, if a first signal is propagated from a node "A," at the node "A" the signal will have some waveform, it will have some arrival time, it will have some slew, and it will have some delay. All of these values for a signal at a particular node can be stored and propagated inside a phase container. If the first signal is propagated to a next node, node "C," the same phase container will have different waveform, slew, arrival time, and delay values at node "C" for the propagated first signal. However, if, at node "C," a second signal comes in to node "C" from node "B" (e.g., in addition to the first signal from node "A"), then at node "C" two signals will be present: the first propagated signal from node "A" as well as the second propagated signal from node "B." The two signals are then represented by two phases at node "C": the first phase at node "C" will carry the data for the first propagated signal and the second phase at node "C" will carry the data for the second propagated signal.

"Phase," as used herein, is thus a term used to refer to a group of propagated data values at any particular node in a digital design graph. There may, for example, be five data values within a phase. In IPBA, at each node, these data values are updated and, if possible, merged to create one or more phase containers that are propagated forward. In contrast to PBA, in which signals are analyzed by propagating them through paths one path at a time, in IPBA, signals are propagated through the paths in parallel using a breadth-first search (BFS) graph traversal technique, with all the begin points being taken in one go. Signal propagation thus commences from all begin points substantially simultaneously (as opposed to one path being traversed in its entirety before proceeding to timing analysis of another path), with signal merging happening wherever possible during propagation. This signal merging means that if a first signal "dominates" a second signal, the second signal is not propagated to a subsequent node in the timing analysis. Only a dominating signal is propagated from that node onwards. To "merge phases" at a node thus means to create a new phase container that contains only the dominant values from the multiple phase containers being merged, and to propagate the merged phase rather than propagating each of the individual phases being merged.

"Dominance" of a value in this context means a worst value out of the values being compared. With respect to timing entities which are represented by numbers (e.g., arrival time), the worst value can be determined by directly comparing two values and finding which one is the worst. For late paths, greater arrival time will be the worst, and for early paths, a smaller arrival time will be the worst. With respect to waveforms, dominance is determined by looking at the shapes of two candidate waveforms. Dominance of one waveform over another means a larger value at all relevant times in the simulation when the two time series are compared on a time-instant-by-time-instant basis. Accordingly, two waveforms will not be merged, but instead will be propagated separately, if, for some time values, one of the two waveforms comprises voltage values greater than those of the other of the two waveforms but, for one or more other time values, comprises voltage values less than those of the other waveform. In other words, if, graphed together, the graph of one waveform crosses the graph of the other waveform, neither of the two is dominant. If no waveform is dominant, they will not be merged during IPBA and will be propagated separately. As waveforms propagate through multiple nodes in a path, it can be expected that the waveforms will get smoother, which in some cases can mean that two waveforms unable to be merged at one node may become mergeable at some later node in a path.

Clock reconvergence pessimism (CRP) is a difference in delay between the common part of the launching and capturing clock paths, or in other words, maximum clock delay minus minimum clock delay. The most common causes of CRP are re-convergent paths in clock network, and different minimum and maximum delay of cells in the clock network. CRP is considered as a pessimism added to timing analysis in general. This pessimism occurs when the static timing analyzer 114 compares two different clock paths that partially share a common physical path segment, and it assumes the shared path segment has a minimum delay for one path and a maximum delay for the other path. Many circuit designers choose to remove this pessimism, and such pessimism removal is termed as "common point pessimism removal" (CPPR).

Figure 3:
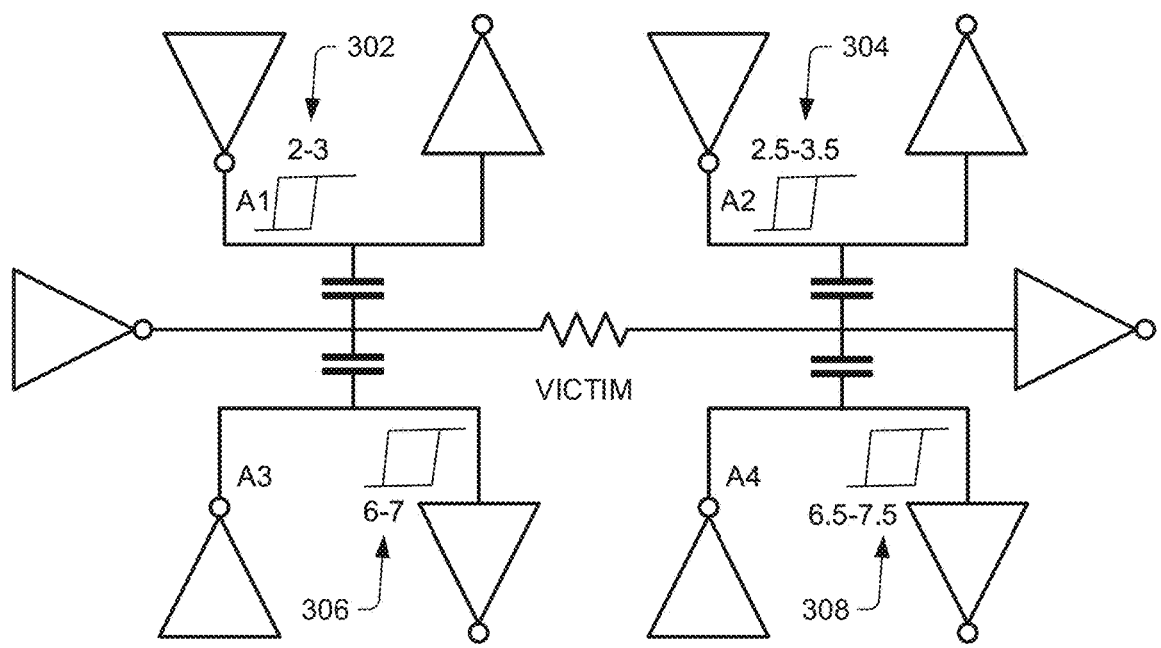
FIG. 3 is an example portion of a digital circuit in timing analysis.

The earliest and latest possible signal arrival times at a node are collectively termed as the "timing window" (TW). In synchronous logical circuit designs, these signal arrival times are with respect to clock phases. A signal that is triggered by a clock phase will have a minimum possible (earliest) arrival time and a maximum possible (latest) arrival time, when it can transition. Timing windows represent the range of time during which a signal can transition, represented as [minArrival-maxArrival]. The minimum or maximum time of this range is known as an "arrival edge." FIG. 3 illustrates a simple circuit with timing windows 302, 304, 306, 308 indicated at various nodes. The numerical ranges given in FIG. 3 represent the timing windows for respective stages of the illustrated circuit. For stage A1, the timing window range is 2-3, that is, the time interval in which net/signal A1 can switch.

Figure 4:
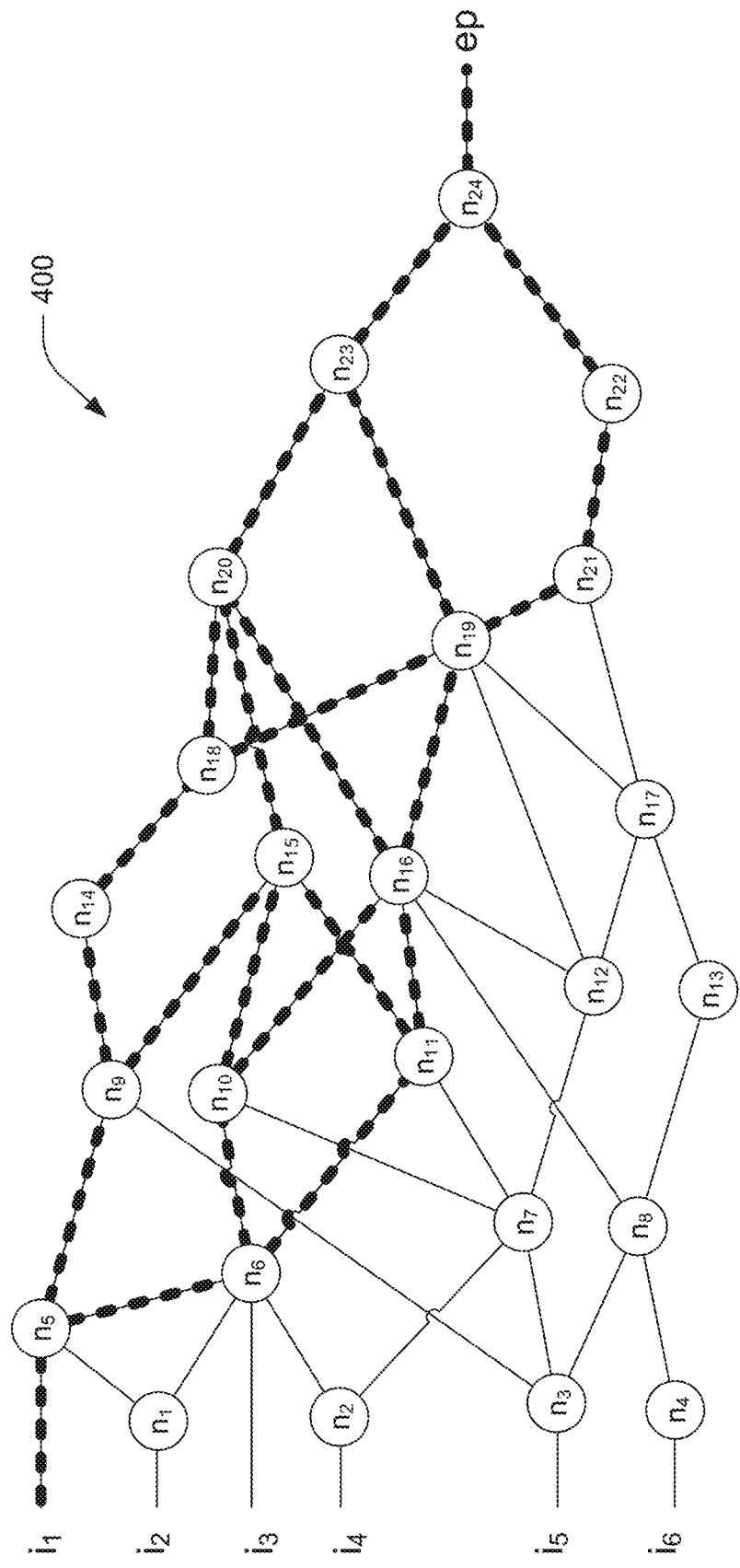
FIG. 4 is an example graph with paths peeled in exhaustive PBA (EPBA) between only a first beginning node and an endpoint node.

The example network diagram of FIG. 4 illustrates an example EPBA process for a network 400 of twenty-four nodes in a circuit design, the nodes numbered $n_1$ through $n_{24}$, the network 400 having six inputs numbered $i_1$ through $i_6$, and one endpoint labeled ep. The nodes are arranged such that signals propagate through the network only from left to right in the diagram as drawn. Provided enough time and computing resources, the goal of EPBA is to achieve full PBA coverage of all timing paths in the circuit design. As there can be multiple paths having the same endpoint, or even having the same start point/endpoint combination, EPBA is aimed at retiming all the timing paths at every GBA-violating endpoint in the design. All the GBA-violating paths are enumerated for PBA analysis up to the defined Nworst depth or until all paths to a violating endpoint have been exhausted. As shown in FIG. 4, for a given endpoint ep, there can be multiple timing paths that need to be retimed, even corresponding to one start point ($i_1$). Accordingly, there could be a very large number of timing paths corresponding to every endpoint in a larger circuit design. Even for the relatively small graph of FIG. 4, there are numerous paths (labeled in bold broken lines) between start point $i_1$ and endpoint ep. The number of paths can be even greater than might be apparent by tracing paths from the diagram of FIG. 4, because even within a node there may be different paths, given that the transition of a signal (e.g., from "high" to "low", or "low" to "high") can be different, and "rise paths" are treated as separate paths than "fall paths" for the purposes of timing analysis.

PBA helps remove the timing pessimism introduced by GBA, which propagates worst-case timing across an analyzed design. Conventionally, once GBA analysis is done, human users select timing violations flagged by GBA and analyze them with PBA analysis, path by path, to determine if these paths are still violating after PBA's amelioration of the pessimism added by GBA. With increasing design sizes and complexity, it can be time-inefficient and practically impossible to guarantee covering all possible failures with PBA, and any remedial transformation ("fixing") of the design to eliminate timing violations is only as reliable as computed PBA results.

Because any violating endpoint may have a number of paths arriving at it, in order to declare a GBA-detected violating endpoint "clean" (e.g., free of timing violations), all paths to that endpoint have to be analyzed with PBA, and their PBA slacks evaluated. As the paths driving the given endpoint are ordered with respect to GBA slacks and not with respect to PBA slacks, it is possible that Nth path might pass with PBA but the (N+1)th path might still fail. To ensure that all paths leading to a given endpoint meet timing requirements, it does not suffice to evaluate the first N GBA-violating paths using PBA and to declare the rest as "clean" (non-violating) merely because the first N GBA-violating paths turn out to be clean after PBA analysis. Even if the first N GBA-violating paths are clean, a subsequent GBA violating path might still violate for PBA slack.

EPBA addresses the above requirement to evaluate all paths leading to a given endpoint to make sure there that all timing violations are covered. EPBA can be configured with high depth and software can evaluate the number of paths (equivalent to this depth) per endpoint to flag the worst PBA violation discovered out of this depth. Endpoint depths typically vary from 10,000 to several million. EPBA techniques are of limited use in large designs or in designs having re-convergent logic, because such designs exhibit a combinational explosion in the number of paths. A number of factors contribute to the inability of EPBA to timely cover all paths in a design, among them the following. First, an exhaustive search of all paths may time out, or a search performed to a specified path depth may max out, before all begin points and endpoints are covered. Second, impractically long runtimes may be required to cover the endpoints/paths within the max paths and Nworst depth search limits, such that the intended path coverage may not be achieved within an acceptable runtime or there may be insufficient computing resources to do so. Third, no existing tools support incremental PBA analysis, e.g., analysis only on remaining paths, where EPBA is attempted multiple times consecutively. Each EPBA iteration starts a full PBA analysis of all timing paths all over again, and there is no mechanism to preserve the previous state of PBA iteration (if any), meaning that the timing paths already analyzed are re-analyzed in every PBA iteration. All the timing paths, within the max paths search limit and Nworst depth search limit, are retimed. However, if the max paths search limit or the Nworst depth search limit is hit with paths or endpoints remaining, no PBA analysis is done on those, and such paths cannot be retimed, as illustrated in the following example.

Figure 5:
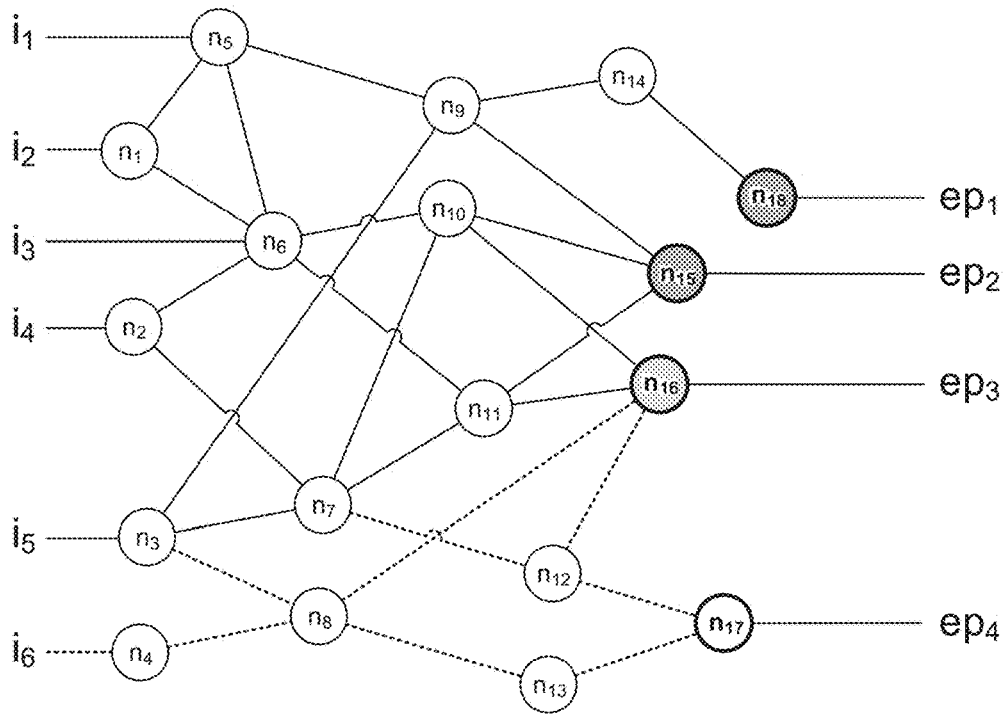
FIG. 5 is an example graph illustrating the result of EPBA.

FIG. 5 illustrates an example signal flow network graph, simplified for illustrative purposes, having four GBA violating endpoints $ep_1$, $ep_2$, $ep_3$, $ep_4$ having a number of begin points $i_1$, $i_2$, $i_3$, $i_4$, $i_5$, $i_6$ and numerous timing paths between them (illustrated as solid or broken lines). Paths are processed until defined Nworst depth & max path upper limits are hit, or available design depth is exhausted within the specified Nworst depth limit. The endpoint PBA coverage percentage is a function of the total number of timing paths in the design, the Nworst depth search limit, and the max paths search limit. In the diagram, darker-shaded endpoints $ep_1$, $ep_2$ are those that have been fully retimed (at least to within the Nworst depth search limit) and thus have a guaranteed worst PBA slack. Lightly shaded endpoints $ep_3$ are endpoints that have been partially retimed, but for which the worst PBA slack is not guaranteed. Unshaded endpoints $ep_4$ are those that have not been retimed by PBA analysis, meaning that they remain GBA bounded.

In the example of FIG. 5, when EPBA is attempted to retime all paths, the analysis can be depth-limited and/or runtime-limited. In the illustrated example, the search limits have been exhausted such that only endpoints $ep_1$ and $ep_2$ are exhaustively PBA covered with true worst slack identified for the defined Nworst depth search limit. Endpoint $ep_3$ is only partially PBA covered, such that the slack reported on $ep_3$ in this case is the GBA slack of the (N+1)th path, as some paths to that endpoint remain beyond the specified Nworst depth limit. As indicated by the broken-line paths leading to endpoint $ep_4$, endpoint $ep_4$ is not covered at all, due to the max paths search limit being exhausted. Therefore, the true worst PBA slack in this example will be provided only for endpoints $ep_1$ and $ep_2$ and many endpoints/paths may not get completely analyzed or analyzed at all using PBA.

Although it is theoretically possible to use higher and higher depths to let the exhaustive PBA solve the problem of evaluating all paths leading to an endpoint and to learn if there is a real PBA violation leading to the analyzed endpoint, as a practical matter, with increased depth, the PBA runtime needed to evaluate more and more paths increases to the point where it becomes unrealistic to evaluate all possible paths to violating endpoints. With EPBA, designers either evaluate up to depth N and fix the GBA timing of the (N+1)th path to avoid any PBA violation risks, or must take the calculated risk of waiving off the evaluation of paths beyond depth N.

Figure 6:
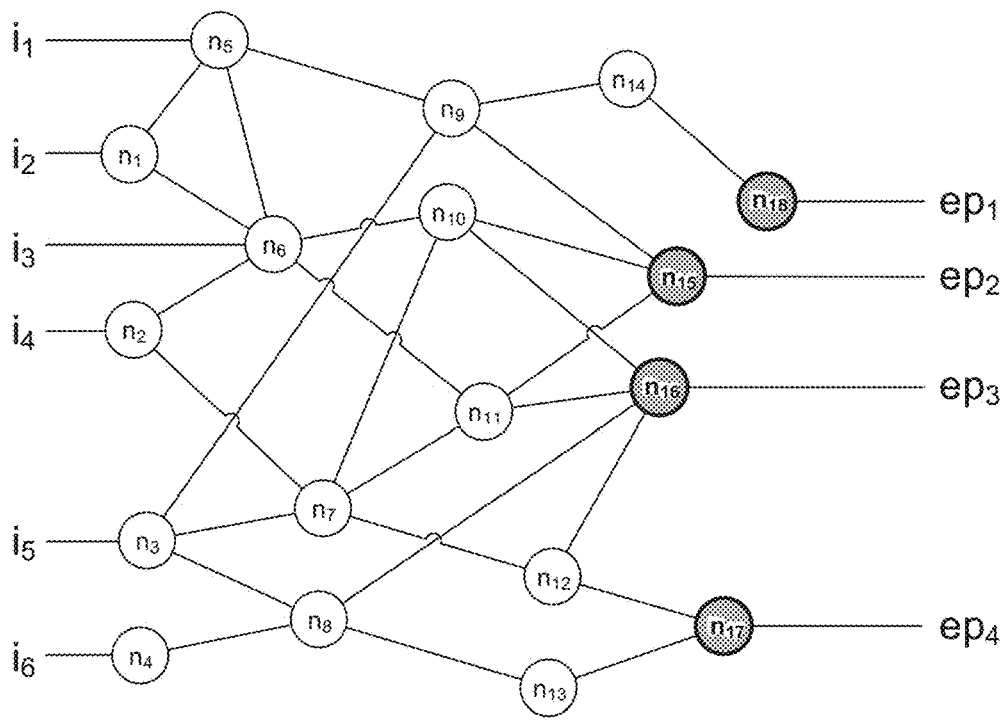
FIG. 6 is an example graph illustrating the result of infinite-depth PBA (IPBA).

FIG. 6 illustrates the example graph of FIG. 5 but as analyzed using IPBA. In IPBA, individual phases with PBA slews, arrivals, and/or waveforms are propagated across stages, ensuring that the PBA graph is created such that all paths may be retimed within practicable runtimes, and 100 percent PBA coverage of all violating paths is attained. As indicated by the darker shading of the endpoints in the example of FIG. 5, all four of the endpoints are retimed and have computed IPBA slack associated with them.

As used in the present application, "propagation" of a signal means computation of values describing the signal at a node in a path based on corresponding values at a preceding node and other information describing changes to the signal between the preceding node and the node. "Traversal" of a path or a graph of multiple paths, by contrast, refers to the order in which propagations are computed. The multiple paths of a circuit-design graph can be traversed serially (path-by-path), as in EPBA, or, as in IPBA, in parallel. Serial traversal of the paths involves propagation of one or more signals between nodes of one path in the graph before propagating one or more signals between nodes of a different path in the graph. Thus, in the simple graph of FIG. 6, which includes the following N paths:

1. $i_1 \rightarrow n_5 \rightarrow n_9 \rightarrow n_{14} \rightarrow n_{18} \rightarrow ep_1$
2. $i_1 \rightarrow n_5 \Delta n_9 \rightarrow n_{15} \rightarrow ep_2$
3. $i_1 \rightarrow n_5 \rightarrow n_6 \rightarrow n_{10} \rightarrow n_{15} \rightarrow ep_2$
4. $i_1 \rightarrow n_5 \rightarrow n_6 \rightarrow n_{10} \rightarrow n_{16} \rightarrow ep_3$
5. $i_1 \rightarrow n_5 \rightarrow n_6 \rightarrow n_{11} \rightarrow n_{11} \rightarrow n_{15} \rightarrow ep_2$
6. $i_1 \rightarrow n_5 \rightarrow n_6 \rightarrow n_{11} \rightarrow n_{11} \rightarrow n_{16} \rightarrow ep_3$
7. $i_2 \rightarrow n_1 \rightarrow n_5 \rightarrow n_9 \rightarrow n_{14} \rightarrow n_{18} \rightarrow ep_1$
8. $i_2 \rightarrow n_1 \rightarrow n_5 \rightarrow n_9 \rightarrow n_{15} \rightarrow ep_2$
9. $i_2 \rightarrow n_1 \rightarrow n_5 \rightarrow n_6 \rightarrow n_{10} \rightarrow n_{15} \rightarrow ep_2$
10. $i_2 \rightarrow n_1 \rightarrow n_5 \rightarrow n_6 \rightarrow n_{10} \rightarrow n_{16} \rightarrow ep_3$
...
N. $i_6 \rightarrow n_4 \rightarrow n_8 \rightarrow n_{13} \rightarrow n_{17} \rightarrow ep_4$ a serial path-by-path traversal of the graph, as used in EPBA, might involve propagation of one or more signals provided to input $i_1$ through nodes $n_5$ to $n_9$ to $n_{14}$ to $n_{18}$ and on to endpoint $ep_1$, before moving on to propagate signals from nodes $n_5$ to $n_6$ to $n_{10}$ to $n_{15}$ to endpoint $ep_2$, for example. In other words, each path is considered one at a time in such serial analysis. By contrast, a parallel stage-by-stage traversal of the graph, as used in IPBA, considers nodes of multiple paths before completing analysis of any one path. As an example, such a parallel stage-by-stage traversal might slot nodes $n_1$, $n_2$, $n_3$, and $n_4$ into a first stage, nodes $n_5$ and $n_6$ into a second stage, nodes $n_7$ and $n_8$ into a third stage, nodes $n_9$, $n_{10}$, and $n_{11}$ into a fourth stage, nodes $n_{12}$, $n_{13}$, and $n_{14}$ into a fifth stage, and nodes $n_{15}$, $n_{16}$, $n_{17}$, and $n_{18}$ into a sixth stage, and might then proceed to propagate signals through these nodes largely in the order in which they have been numbered in the drawing, e.g., $i_2$ to $n_1$; $i_4$ to $n_2$; $i_5$ to $n_3$; $i_6$ to $n_4$; $i_1$ and $n_1$ to $n_5$; $i_3$, $n_1$, and $n_2$ to $n_6$; $n_2$ and $n_3$ to $n_7$; $n_3$ and $n_4$ to $n_8$; and so forth.

The parallel, stage-by-stage analysis of the graph yields several advantages. One advantage is that multiple nodes in a stage can be analyzed substantially contemporaneously using parallel processing, e.g., with plural computer processors or processing cores. Another advantage is that propagated phases, containing the information representative of the propagated signals, can be merged at convergent nodes based on the criteria described above. In the example graph of FIG. 6, node $n_{11}$ converges paths from nodes $n_6$ and $n_7$, which both receive signal(s) from node $n_2$ and ultimately from $i_4$. This merging results in a reduction of information that needs to be propagated and processed further in the analysis, e.g., in the present example, at node $n_{16}$, which receives the signal(s) from node $n_{11}$.

In static timing analysis, simulated signals propagated through a circuit design are represented by timing characteristic values including such values as waveform, slew, and arrival edge. Accordingly, these timing characteristic values are propagated, updated, and, where possible, merged in IPBA. Such timing characteristic values from one phase can respectively correspond to timing characteristic values from another phase. For example, a waveform of one phase at a node can have a corresponding waveform of another phase at the node; a slew of the one phase can have a corresponding slew of the other phase; and an arrival of the one phase can have a corresponding arrival of the other phase.

Figure 7:
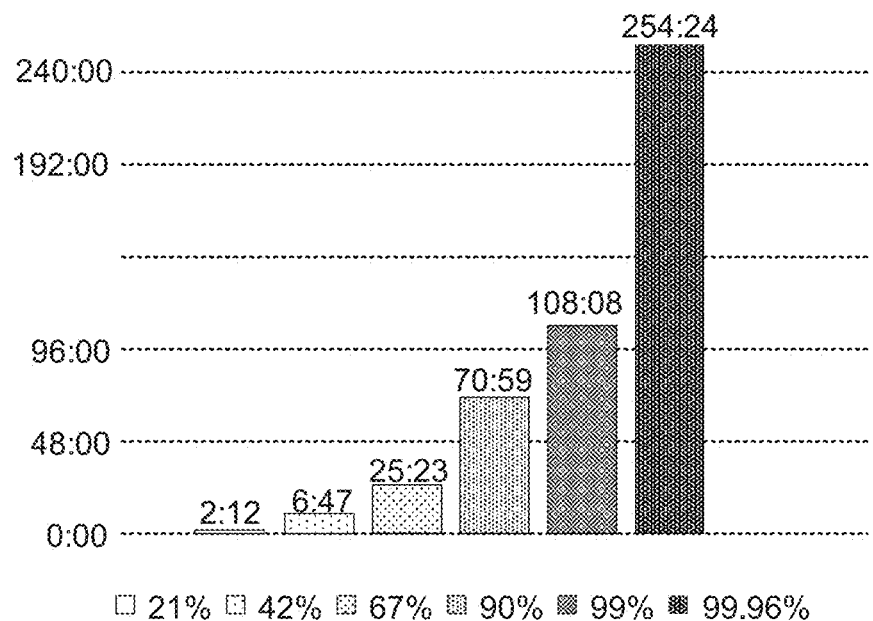
FIGS. 7 and 8 are bar charts showing runtime versus coverage for two different example digital circuit designs using IPBA.
Figure 8:
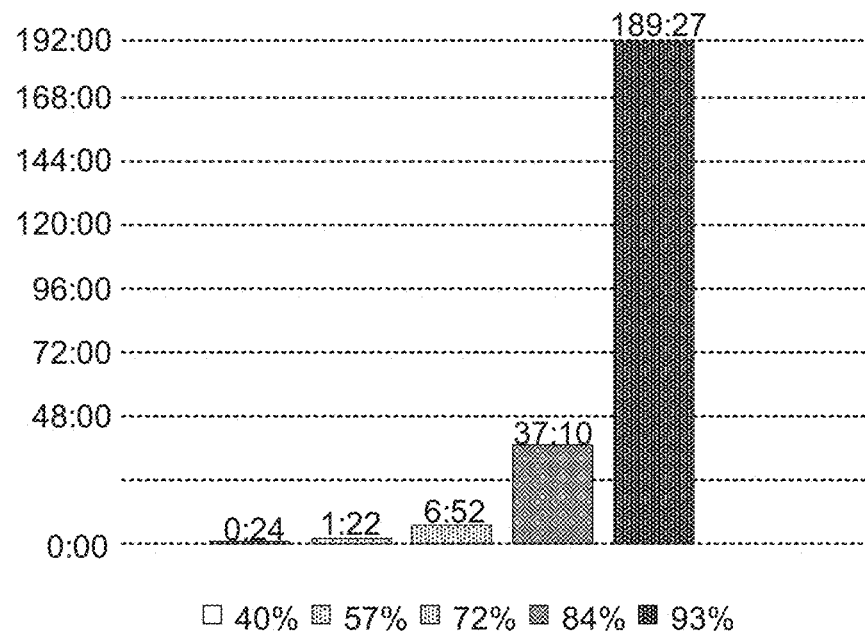

The problem of PBA and limited coverage versus runtime metric is illustrated in the bar graphs of FIGS. 7 and 8. FIG. 7 shows, for each of six coverage percentages, the cumulative regular EPBA runtime for a first digital circuit design, Design A, having 5 million instances and 2.4 million GB A-violating nodes. FIG. 8 shows, for each of five coverage percentages, the cumulative runtime for a second digital circuit design, Design B, having 9.6 million instances and 0.5 million GBA-violating nodes. Each design has complex combinational structures, as discussed above. FIG. 7 shows that 99 percent coverage of Design A is attained with a runtime of 108 hours and 8 minutes, and 99.96 percent coverage of Design A is attained with a runtime of 254 hours and 24 minutes. FIG. 8 shows that 84 percent coverage of Design B is attained with a runtime of 37 hours and 10 minutes, and 93 percent coverage of Design B is attained with a runtime of 189 hours and 27 minutes. None of the runs converge or attain 100% coverage, even after runtime of more than a hundred hours. Thus, the regular EPBA technique may not be able to evaluate all violating paths to a given endpoint, demonstrating the need to generate signoff-quality EPBA results without a requirement of peeling and analyzing an impracticably high number of PBA depths.

The underlying cause of high analysis times using regular EPBA with higher depth is the practically infinite number of paths possible for a given endpoint because of highly re-convergent logic driving the endpoints. Regular EBPA systems and methods repeatedly peel the Nworst paths for the endpoints and evaluate the PBA timing for them, but this path peeling never ends because of the re-convergent logic, leading to intractable runtimes and restricted design coverage. IPBA propagates PBA timings throughout the network graph in a similar manner as in GBA, doing away with the need for peeling individual paths for retiming. Specifically, IPBA propagates PBA results on top of PBA phases rather than on individual paths. The propagated phases are merged wherever possible so as to propagate the phases coming from multiple branches together. This phase merging has the effect of pruning non-worst paths during the analysis. IPBA thus provides the ability to process PBA for unlimited/infinite depths, cutting down the PBA processing runtime significantly while also helping to attain more complete PBA design coverage. The reduced runtime can be leveraged to enhance PBA coverage.

In IPBA, propagated PBA phases are selectively merged, or otherwise, multiple phases are propagated together. For a given multi-input stage, based on different inputs corresponding to respective phases, the PBA delays of the stage are different for the different phases. This is unlike GBA analysis, wherein every stage has the same delay irrespective of individual phase arrival or corresponding inputs, like waveform.

In IPBA graph creation, first, violating nodes of a GBA graph are slotted into stages per their respective arrivals. Not necessarily all GBA-violating nodes will be so slotted in IPBA. In some examples, only "marked" nodes in a so-called "critical region" consisting of a designated subset of the plurality of timing paths are so slotted into stages. In some examples, the IPBA-tested portion of the graph may even be widened beyond the GBA violating zone. Once slotting is done, the PBA timing phases are propagated stage by stage starting from begin points. At every stage, respective phases are propagated to respective next stages with PBA delays. Delay for every stage is calculated separately for each phase because the stage delay calculation uses the retimed SI victim edge (rather than the timing window, which is used by GBA) and the waveform corresponding to that specific phase. Using this delay calculation, detailed, accurate waveforms are propagated, such that IPBA provides results that are similar to those obtained by conventional EPBA.

The individual phase-specific retimed delays, waveforms, and/or slews are propagated across stages. At converging points in the path where multiple delays or waveforms of the same phase cannot be propagated forward (such as at the output of multi-input gates), the retimed delays of similar phases are merged based on one or more criteria (discussed below with regard to FIG. 9). To reduce pessimism and improve accuracy of computed slacks, IPBA can defer merging until a later stage downstream of a stage where two signals are joined, as discussed in greater detail below.

IPBA offers faster analysis convergence of a design as compared to conventional EPBA. U.S. Pat. No. 10,776,547 B1, incorporated by reference, describes how retimed phases are calculated, propagated, and merged in IPBA.

IPBA can employ phase merging to increase computational efficiency. Due to the increased computational cost of simulation associated with the proliferation of phases when phases are propagated throughout a digital circuit design graph, it can be practically impossible to branch out phases at every diverging point in the graph and propagate them separately, without merging them downstream. Accordingly, in IPBA, similar phases can be merged at or downstream of nodes where signals are joined (the merging can be deferred by a number of stages (e.g., two stages) from the initial stage where the signals are joined to reduce the impact of merging pessimism). Even with phase merging, not all incoming phases to a node necessarily will be merged in IPBA. For example, if five source nodes are connected to a current node in a digital design graph, the analysis at the current node will receive as inputs five phases from each of the source nodes. In some instances, it may be the case that none of these five phases can be merged (e.g., because they do not meet established merging criteria), whereupon all five of these phases will be propagated on from the current node in the analysis. In other instances, for example, two sets of two of these phases will be mergeable, in which case, three phases (two of them being merged phases) will be propagated on from the current node in the analysis. In still other instances, it may be the case that all five phases can be merged, in which case, only one phase will be propagated on from the current node in the analysis.

Figure 9:
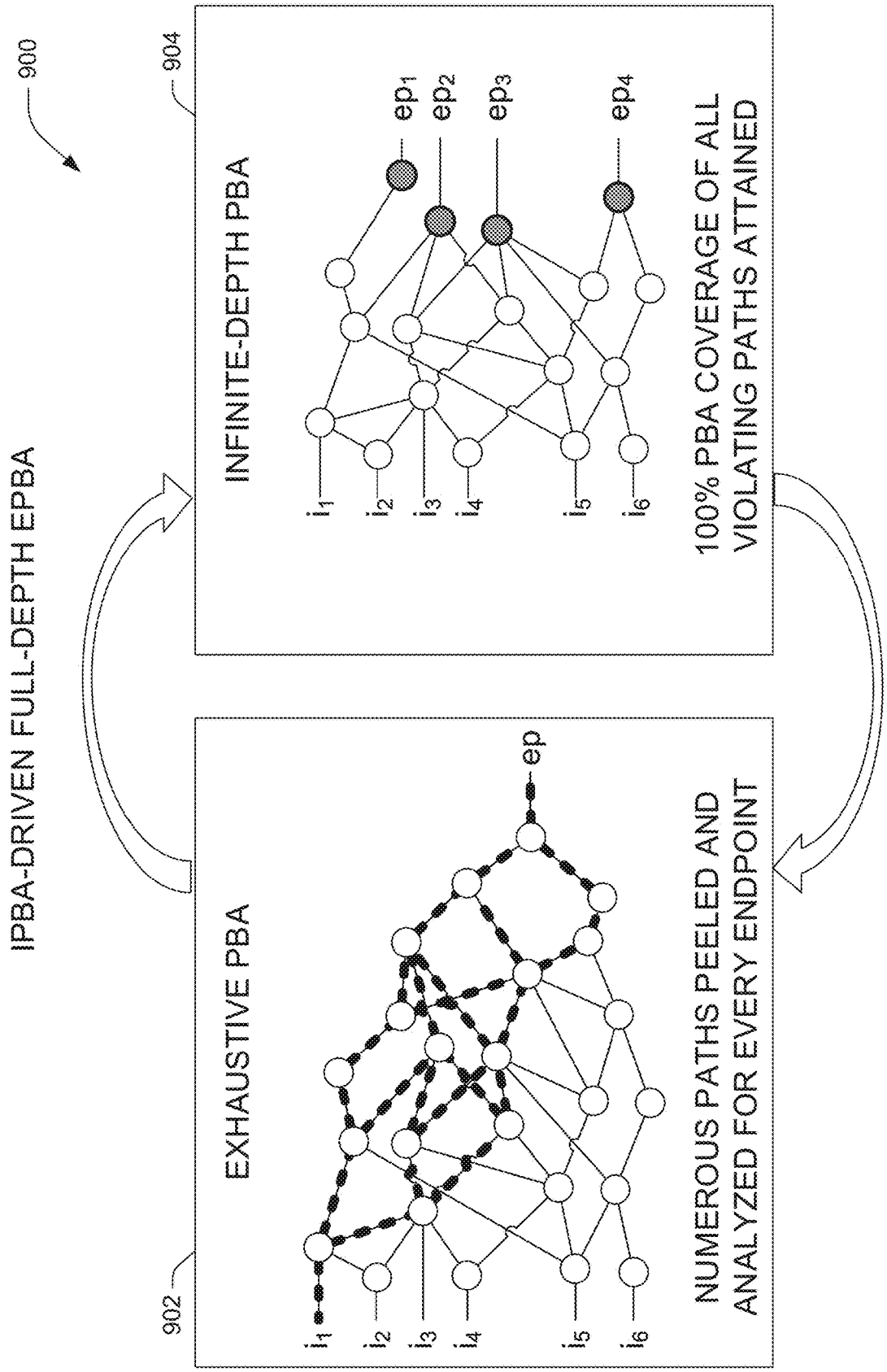
FIG. 9 illustrates an example of IPBA-driven full-depth EPBA.

FIG. 9 conceptually illustrates IPBA-driven full-depth EPBA 900, in which a conventional EPBA process 902 is informed by a parallel-running IPBA process 904 during setup-mode analysis, and IPBA is informed by a parallel-running EPBA process during hold-mode analysis. Thus, an EPBA can be driven by IPBA-based approach for endpoint convergence, and IPBA can be dependent upon feedback from an EPBA-based approach, to provide full-depth results that can report a worst slack at all GBA-violating endpoints. By path peeling using EPBA analysis while running IPBA analysis in parallel, endpoints can be marked as converged as soon as a path with worst PBA slack leading to the endpoint is determined by EPBA, thereby addressing issues related to exact worst slack, non-worst fan-in independence, and support for multiple paths per endpoint.

IPBA-driven full-depth EPBA can also create different zones of different signals being propagated. These "zones" are multidimensional regions surrounding signals plotted in a multidimensional space and serve as thresholds for determining whether two signals are close enough to each other within the multidimensional space to be considered similar enough to each other to be merged. Such "zones" should not be confused with the GBA-violating zones of the circuit design, described above. Propagated signals with similar characteristics are clustered in a similar zone and non-worst signals from a cluster can be pruned, or merged with a worst signal in the cluster. This use of such zones for merging helps to address optimism that can arise in IPBA when merging of two signals with unlike characteristics (e.g., waveform, skewness, sensitivities).

IPBA-driven full-depth EPBA can make IPBA driven by (dependent on) EPBA for the endpoints which can converge very quickly, and can make the EPBA analysis driven by IPBA for the endpoints which could not converge quickly. Full-depth analysis and closure can thereby be achieved quickly both for designs for which EPBA cannot be performed full-depth due to convergence issues designs, and for designs that do not have convergence issues and for which IPBA thus incurs overly lengthy runtimes (greater than would be incurred by EPBA) because of its IPBA' s BFS-based signal propagation. IPBA-driven full-depth EPBA thus offers the advantages of both worlds EPBA and IPBA and can report the worst PBA slack at given (e.g., GBA-violating) endpoints while also addressing drawbacks of earlier IPBA-based systems and methods.

Conventional EPBA peels paths in a timing graph one by one, and evaluates peeled paths to report a path determined to have the worst PBA slack. Where EPBA can evaluate all the paths to given endpoint, within timeout and/or maximum depth constraints on the analysis, it can conclude that the endpoint is converged, and the determined worst slack is safe (not inaccurately optimistic) for sign-off. Since the reported slack is specific to a path, a user can, if desired, check the analysis by hand-calculating the slack numbers by examining the stages specific to that path. In instances where not all paths to a given endpoint are fully evaluated, e.g., because of timeout or maximum depth constraints, such an endpoint may be referred to as un-converged, because an un-evaluated path may have a worse PBA slack than the evaluated paths. Thus, even though path tracing and PBA slack reported by EPBA is accurate, convergence is not guaranteed for large or complex designs that cannot be fully analyzed with regular EPBA.

By contrast, IPBA propagates signals through all the paths of a timing graph using a BFS traversal of the graph, merging and/or pruning the non-worst signals at intermediate nodes in the graph to ensure only a worst signal reaches a given endpoint. At the time of merging during propagation, IPBA can, for example, apply a max operation at merging points to ensure the analysis propagates the worst signal from the merging point onwards. If, for example, two input arrival time values at a merging point are A and B, a max operation can generate a third value Y that is worse than A and B to ensure the worst value is propagated. In cases where A and B are statistical distributions (rather than single values), and Y is thus a statistical distribution generated by combining, in some way, the distributions of A and B, it is not always possible to determine whether Y has been generated based upon propagation of A or has been generated based on propagation of signal B. Consequently, the worst case timing Y reported at a merging point cannot be manually checked by a user by conclusively tracing this timing to a single one of signals A or B.

Figure 10:
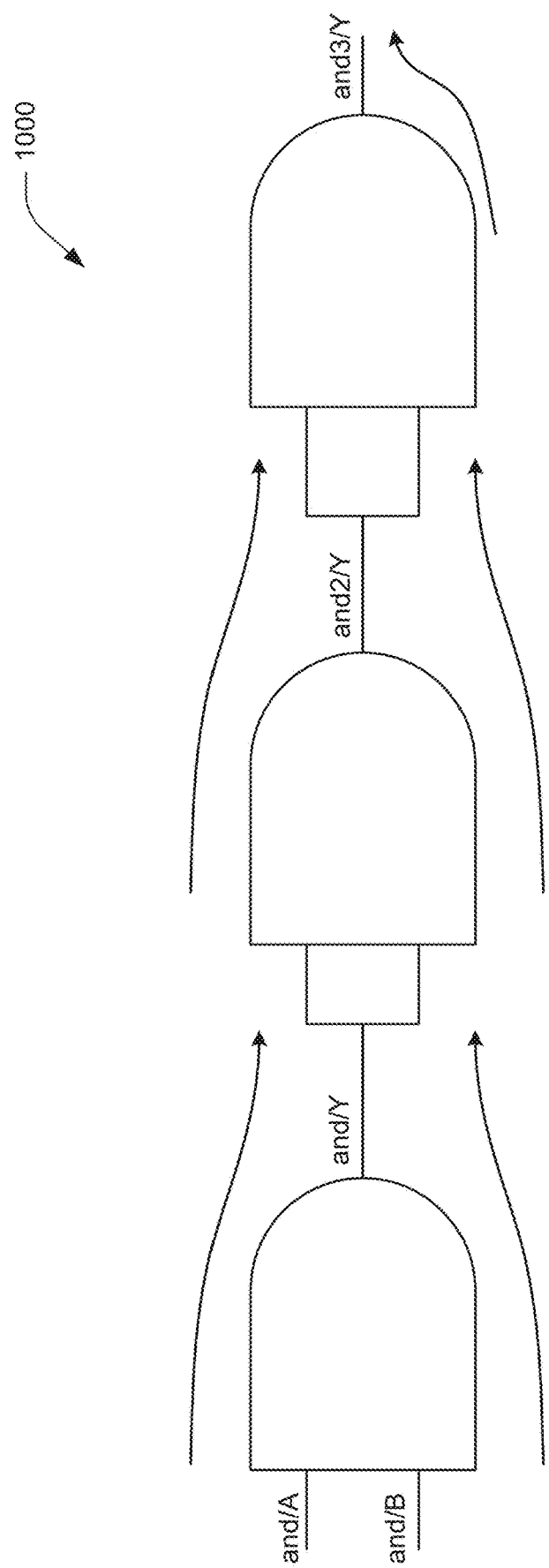
FIG. 10 shows an example of propagation of phases using IPBA through digital gates to illustrate the traceability of individual paths through converging logic.

In the example diagram 1000 of FIG. 10, re-convergent signals are propagated through three AND gates arranged serially. Although IPBA can determine a worst arrival at endpoint and3/Y, it might not be able to conclusively determine in all cases whether this worst arrival is coming from input and1/A or and1/B. Thus, while IPBA guarantees convergence, it does not guarantee accurate path tracing, and there might be some pessimism present in final slacks due, for example, to intermediate max operations.

Figure 11:
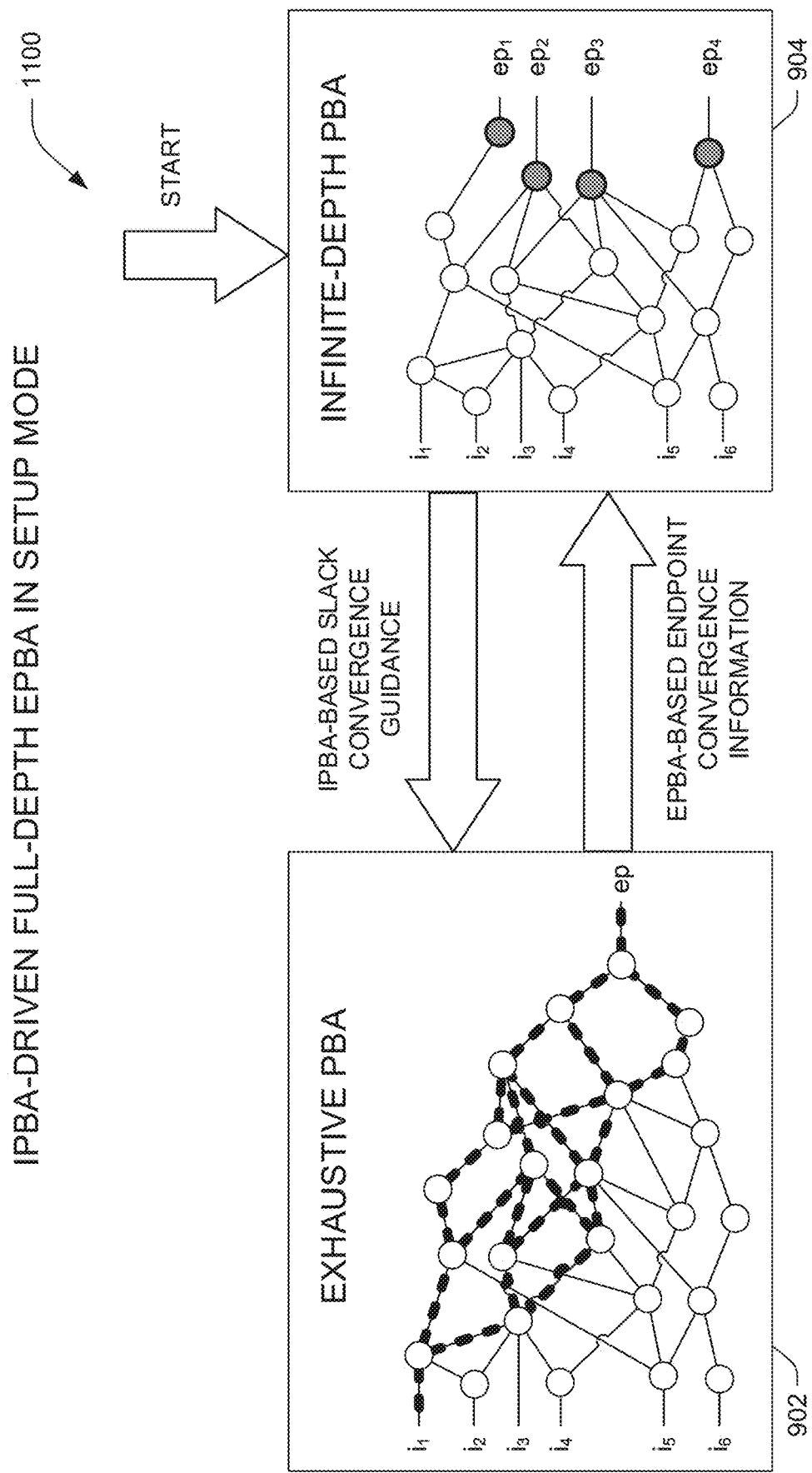
FIG. 11 illustrates an example of IPBA-driven full-depth EPBA in setup mode.

PBA can be conducted in setup mode or in hold mode. FIG. 11 illustrates the setup-mode case 1100, in which IPBA-driven full-depth EPBA provides inputs from an IPBA process 904 running parallel to a conventional EPBA process 902 to guarantee convergence for endpoints. When IPBA-driven full-depth EPBA is invoked in setup mode, IPBA-based BFS timing propagation and EPBA-based DFS path peeling and analysis are conducted in parallel. When IPBA slacks are available on a given endpoint, feedback that includes the available IPBA slacks is passed on to the EPBA process conducting the analysis path by path. The feedback informs the EPBA of the upper bound of worst PBA slack for a given endpoint, allowing the EPBA to determine when (at which step of its analysis) the EPBA process can cease for the given endpoint and declare the endpoint as converged. Since the IPBA-driven full-depth EPBA does PBA analysis path-by-path, it can trace and accurately report the worst path with exact PBA slacks. The IPBA-driven full-depth EPBA does not suffer from the same endpoint convergence issues as conventional EPBA because endpoints can be declared converged based on feedback from IPBA.

Figure 12B:
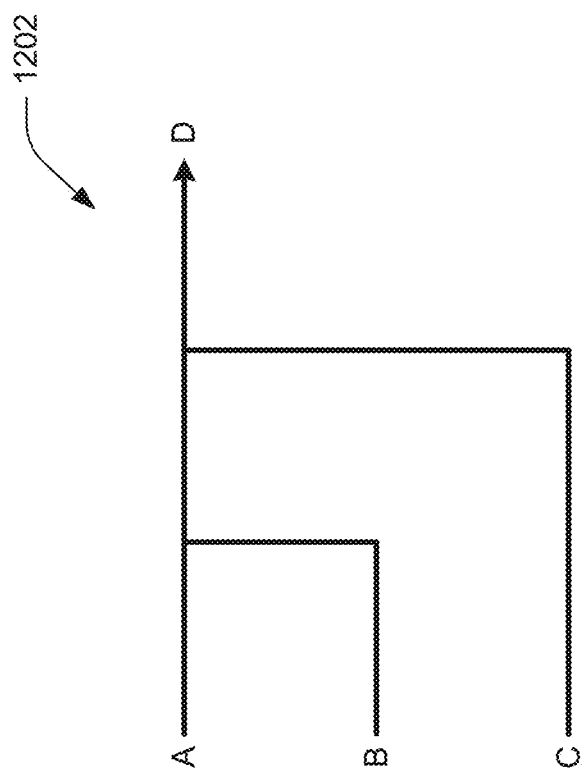
FIGS. 12A and 12B are two example signal propagation graphs.
Figure 12A:
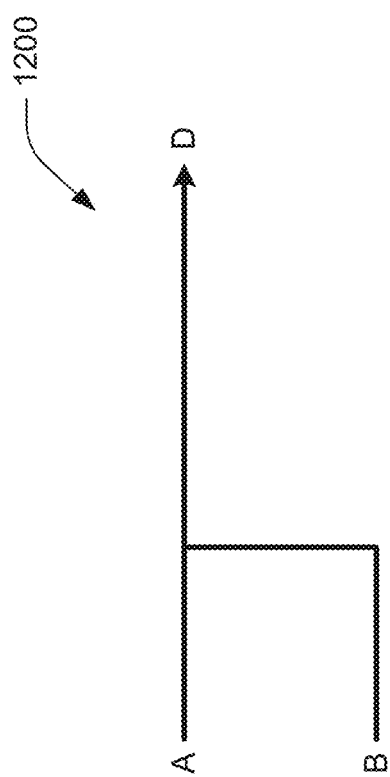

FIGS. 12A and 12B illustrate improvements IPBA-driven full-depth EPBA provide to fan-in dependency and Nworst>1 reporting. IPBA propagates the arrivals of all paths together using BFS graph traversal, merging the non-worst signals with the worst signals at merging points. This merging means that path timings are not derived and stored independently, as they are with conventional EPBA, precluding the reporting of paths that are not the worst, e.g., the second-worst path (Nworst=2), the third-worst path (Nworst=3), and so on. Additionally, because the merged arrivals can be worse than the individual arrivals, final arrival and slack timing can be different based upon different number of input signals merging even though the final worst path is still the same. FIG. 12A illustrates an example first case 1200 in which there are two begin points A and B driving respective paths to endpoint D. FIG. 12B illustrates an example second case 1202 in which there are three begin points A, B, and C driving respective paths to endpoint D. Assuming the path from A to D is the worst in both cases, although the true worst PBA slack at endpoint D is the same in both cases, the IPBA-computed slack might vary between the first case 1200 and the second case 1202, because signal merging may be computed differently at intermediate points as between the first case and the second case. The following example commands might report different slacks even though worst path is same:

report_timing—from {A,B}-to D -retime . . . -retime_mode exhaustive
 report_timing—from {A,B,C}-to D -retime . . . -retime_mode exhaustive In IPBA-driven full-depth EPBA, however, computed IPBA slacks are only used for feedback to converge endpoints. Reported worst paths and slacks would still be derived from EPBA, which reports path-specific slacks. Thus, in IPBA-driven full-depth EPBA, the worst PBA slack would be same in both cases 1200, 1202 irrespective of which fan-in cone is included. Similarly, reporting for multiple paths per endpoint (Nworst>1), which cannot be done with IPBA alone, is feasible in IPBA-driven full-depth EPBA, because IPBA-driven full-depth EPBA performs exhaustive analysis on a path-by-path basis and thus can report results for multiple paths independently.

Figure 13:
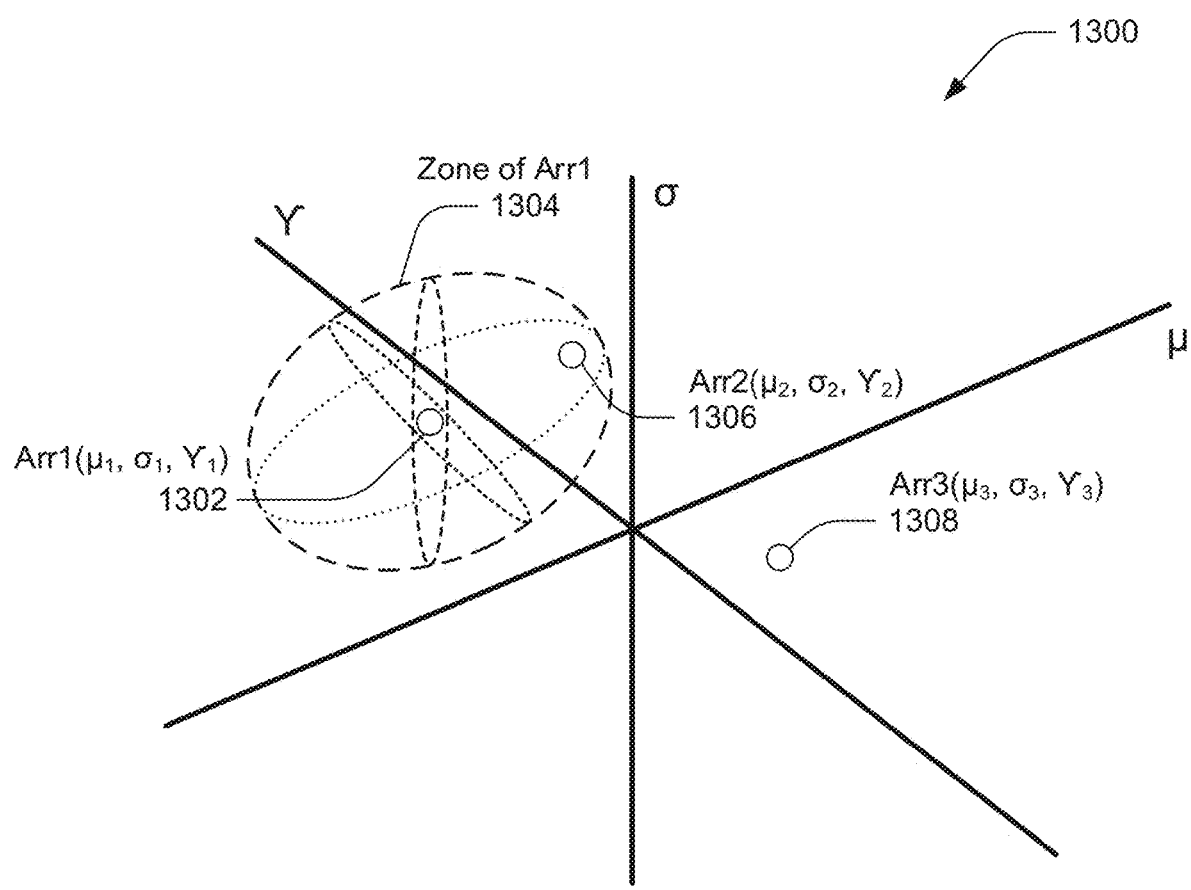
FIG. 13 is an example three-dimensional space in which zones for IPBA merge candidates can be plotted.

FIG. 13 illustrates clustering of signals/phases that IPBA-driven full-depth EPBA can use to mitigate IPBA optimism. In IPBA-driven full-depth EPBA, to compute EPBA bounding slack values, an IPBA process, which can run in parallel to the EPBA process, can propagate timings based upon a BFS graph traversal and can prune the non-worst timings and/or merge them with the worst timings at intermediate nodes to reduce the propagation complexity and runtime. To conclude which among several signals is the worst, the IPBA can determine that the impact of given signal will lead to a non-worst slack quantile for the given endpoint. This decision can be concluded keeping in view the mean ($\mu$), standard deviation ($\sigma$), skewness ($\gamma$), and quantile of arrival and slack time in the presence of Gaussian-distributed random process variations of the CMOS devices modeled by the graph. Taking into account all features available in PBA, such as propagating multiple moments together, including skewness, it is possible that a worst case decision is not always conclusive, and therefore, there exists the possibility of introducing optimism whenever one of the worst signals is marked as a non-worst signal and is merged with a signal considered to be the worst one.

To address these potential optimism issues, IPBA-driven full-depth EPBA can evaluate the placement of different signals being propagated in a multi-dimensional space, a three-dimensional example 1300 of which is shown in FIG. 13, with different attributes (e.g., the three moments $\mu\sigma\gamma$) represented as the dimensions of the space. In the illustrated example 1300, a three-dimensional zone formed by thresholds in each of the dimensions can surround an arrival time merge candidate plotted within the space. Propagated signals with similar characteristics will be clustered closely in the space and non-worst signals sitting closely within the same cluster can be merged with each other. In the illustrated example 1300, arrival time Arr1($\mu_1\sigma_1\gamma_1$) 1302 is surrounded by a zone 1304 defined by positive and negative thresholds in each of the $\mu$, $\sigma$, $\gamma$ dimensions, which thresholds need not necessarily be symmetric in the space. Merge candidate arrival time Arr2($\mu_2$, $\sigma_2$, $\gamma_2$) 1306 is within the zone 1304 and is therefore merged with Arr1 by the IPBA, whereas merge candidate arrival time Arr3($\mu_3$, $\sigma_3$, $\gamma_3$) 1308 is not within the zone 1304 and is therefore not merged with Arr1 by the IPBA. This multi-dimensional clustering can help mitigate potential optimism that can arise due to merging of two signals with unlike characteristics. Although zone 1304 is shown in the illustrated example as an ovoid, in other examples, zones can take other shapes, such as rectangular boxes or amorphous shapes.

Figure 14:
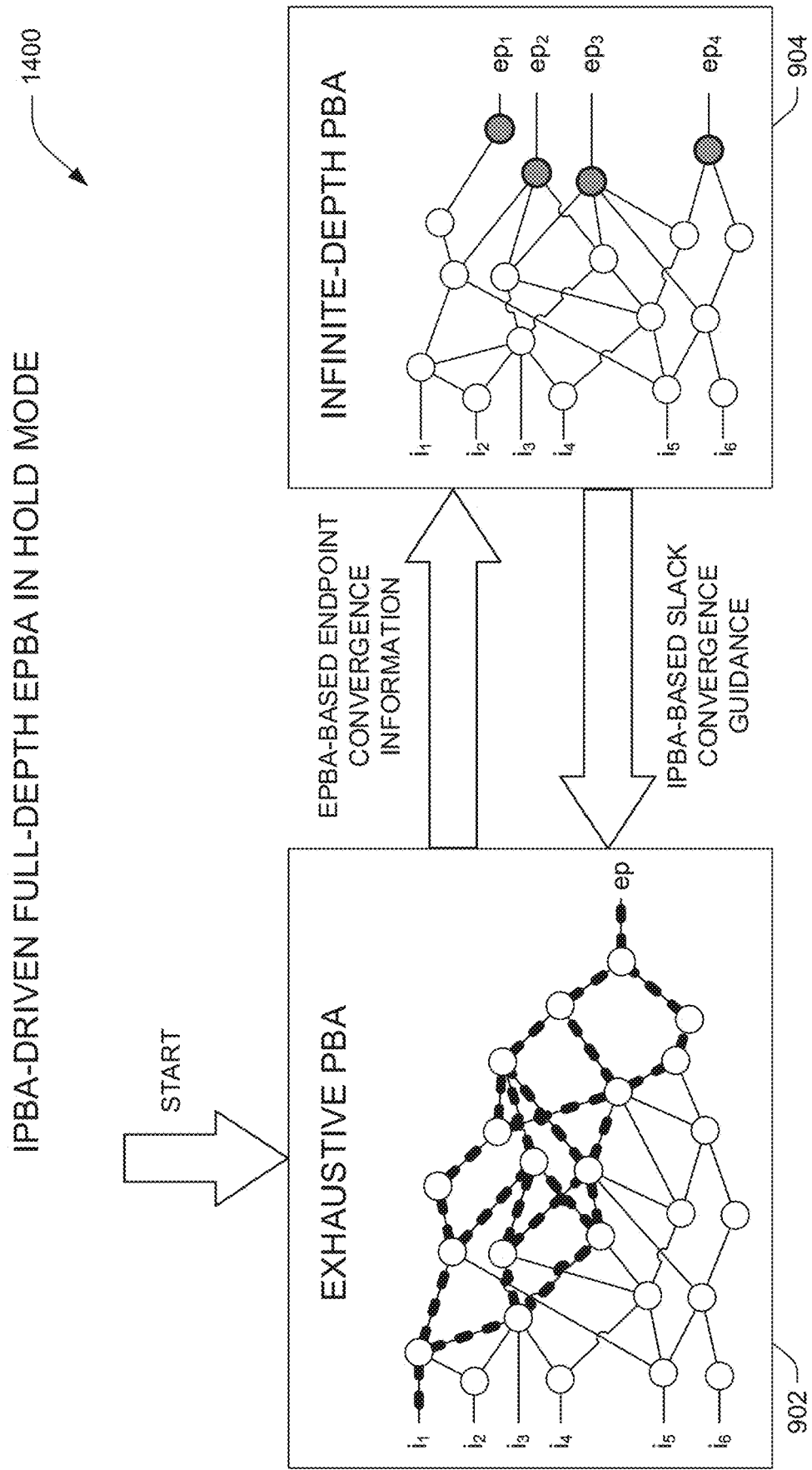
FIG. 14 illustrates an example of IPBA-driven full-depth EPBA in hold mode.

As noted above, PBA can be conducted in setup mode or in hold mode. In setup mode, the paths are generally longer, because setup mode looks for the paths with latest arrivals, whereas in hold mode, the paths are generally shorter, because hold mode looks for the paths with earliest arrivals. In IPBA, hold-mode analysis poses the additional challenge that propagating all paths together in one go can be very runtime costly as compared to conventional EPBA. This is because IPBA also propagates longer paths along with shorter paths. Thus, in hold mode, conventional EPBA analysis may converge faster than IPBA depending on the logic convergence in the simulated design. FIG. 14 illustrates a hold-mode case 1400 of IPBA-driven full-depth EPBA, in which inputs are provided from IPBA process 904 running parallel to EPBA process 902. As in setup mode, when IPBA-driven full-depth EPBA is invoked in hold mode, IPBA-based BFS timing propagation and EPBA-based DFS path peeling and analysis are conducted in parallel. The illustrated two-way feedback loop between EPBA 902 and IPBA 904 effectively address the above-described hold-mode analysis issue. IPBA is done only for those cases where EPBA is not able to converge quickly, and for the rest of the endpoints, EPBA takes the feedback from IPBA analysis to converge these endpoints. This way, the improved runtime performance and convergence results are demonstrated as compared to IPBA alone.

With respect to the quality of result (QoR) expectation for IPB A-driven full-depth EPBA, for all converged endpoints, the worst slack reported can be expected to match the worst possible PBA slacks across all paths for the given endpoints. Results from IPBA-driven full- depth EPBA should therefore match conventional EPBA results if conventional EPBA is left to run to the extent that all possible paths are analyzed individually. In a small number of cases where EPBA iteration is not able to find an exact path to converge with IPBA slack, the STA can report the IPBA slack as the worst bounding slack for that endpoint with the worst PBA path found until that point. This IPBA bounded slack is expected to also bound the slacks of all remaining paths to that endpoint.

GBA slack<=IPBA slack<=IPB A-driven full-depth EPBA slack

Figure 15:
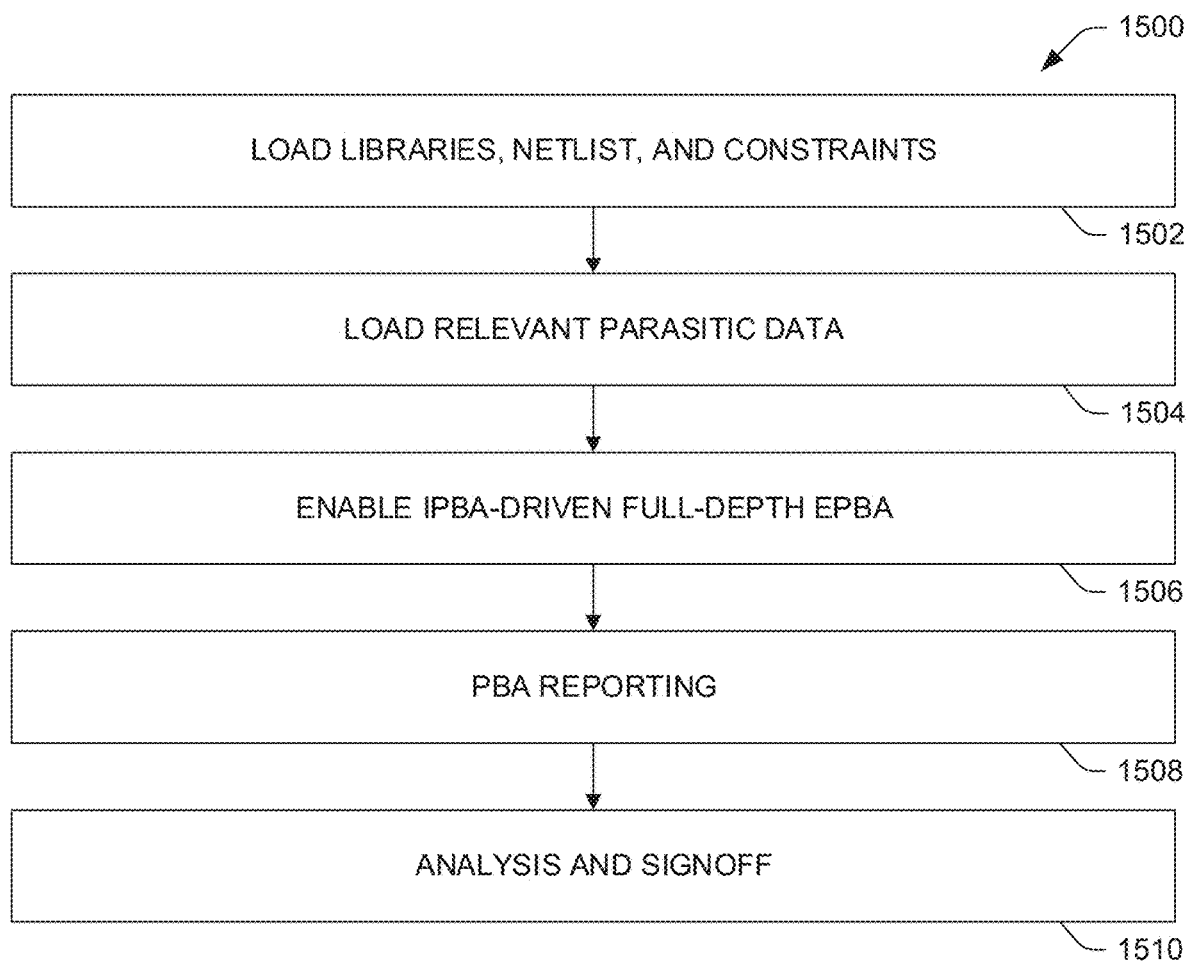
FIG. 15 is a flow chart illustrating an example workflow of a static timing analysis tool that includes an IPBA-driven full-depth EPBA function.

FIG. 15 illustrates a static timing analysis process 1500 that includes IPBA-driven full-depth EPBA to analyze a digital circuit design for timing violations. After relevant inputs to the static timing analysis are loaded 1502, such as libraries, the netlist, constraints, and relevant parasitic data 1504, IPBA-driven full-depth EPBA can be enabled 1506 to perform an IPBA-driven full-depth EPBA method based on the provided inputs and to generate PBA reporting 1508 based on the results of the IPB A-driven full-depth EPBA. Such reporting can be expected to indicate timing violations in the analyzed digital circuit design with reduced pessimism as compared to analogous reporting provided by GBA, but with greater coverage and/or reduced runtime as compared to analogous reporting provided by conventional EPBA, and with reduced pessimism and reduced optimism as compared to IPBA, as well as reduced runtime for hold mode analysis as compared to IPBA for certain designs. Accordingly, analysis and signoff 1510, during which timing violations are addressed with revisions to the digital circuit design, can be accomplished with reduced time and/or lower computing resource requirements as compared to methods using conventional EPBA, but while achieving full depth of coverage, as is not practicable or not possible with conventional EPBA for many complex designs.

Figure 16:
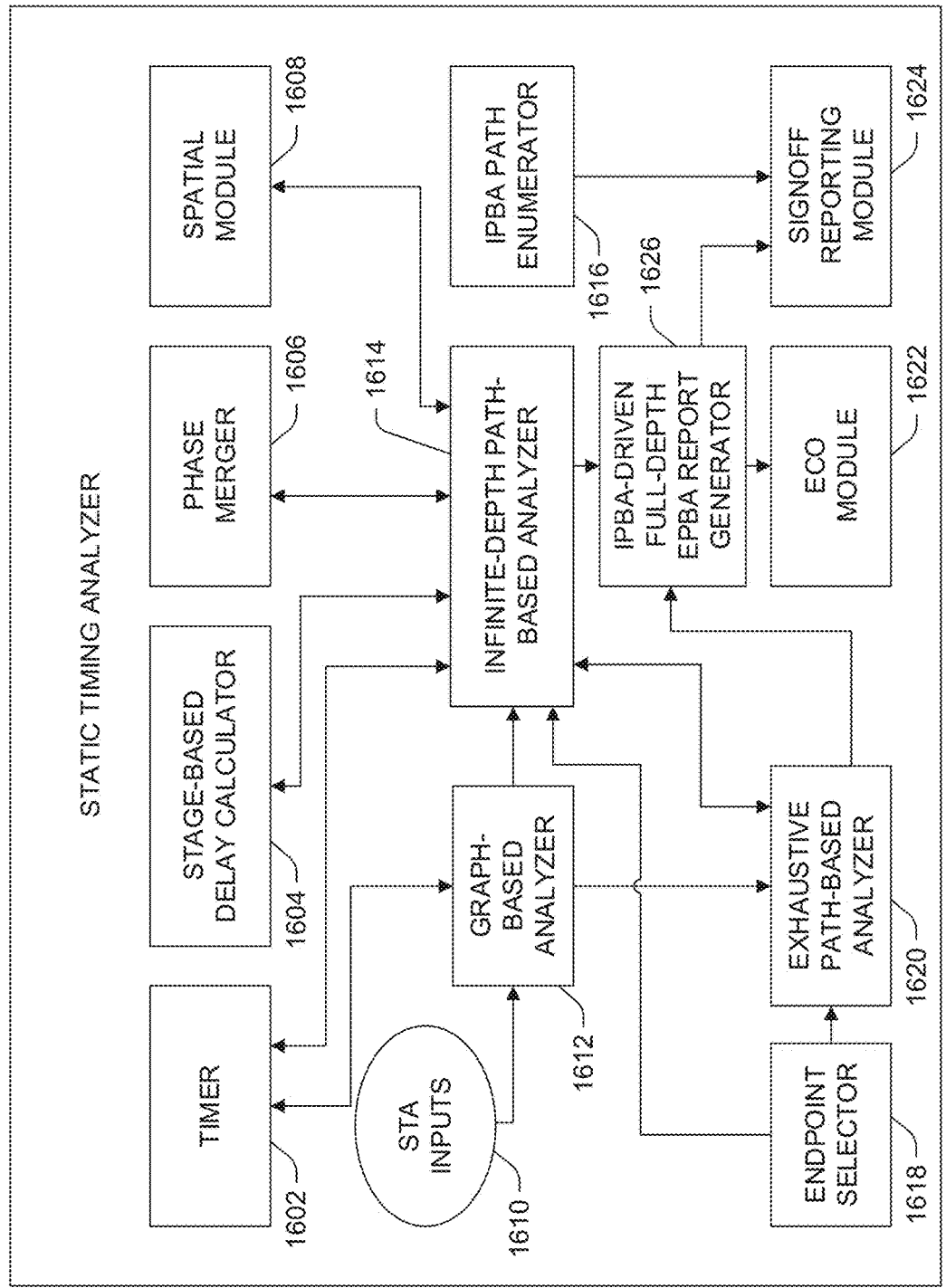
FIG. 16 is a block diagram of an example static timing analyzer that includes an exhaustive path-based analyzer driven by an infinite-depth path-based analyzer.

The system diagram of FIG. 16 illustrates a static timing analyzer 1600 that includes an exhaustive path-based analyzer 1620 that is informed by an infinite-depth path-based analyzer 1614 capable of analyzing portions of a digital circuit design for timing violations with IPBA. Analyzer 1600 can correspond to analyzer 114 of FIG. 1 and can be implemented as one or more software components or in hardware as, for example, one or more application-specific integrated circuits (ASICs). The inputs 1610 for the static timing analysis, e.g., inputs 102-112 illustrated in FIG. 1, can first be provided to a graph-based analyzer 1612 that acts as a coarse filter to identify timing violations in an analyzed digital circuit design with a high amount of pessimism, thereby defining a GBA-violating zone in the circuit design, a set of paths determined by the graph-based analyzer 1612 to violate timing requirements specified by inputs 1610.

The graph-based analyzer 1612 can make use of a timer 1602 to compute signal delay times at nodes in a graph representative of the digital circuit design under analysis. Timer 1602 can also be used by infinite-depth path-based analyzer 1614, which can receive the GBA-violating zone from the graph-based analyzer 1612 and can thereupon use IPBA to perform on the specified subset of the digital circuit design a timing analysis that is less pessimistic and thus more thorough than that performed by graph-based analyzer 1612. An endpoint selector 1618 can assist infinite-depth path-based analyzer 1614 by selecting endpoints for analysis according to specified criteria, e.g., by selecting the top N endpoints with the worst slack (N being an integer) for analysis and reporting. Upon slotting nodes of a graph into stages, infinite-depth path-based analyzer 1614 can further employ stage-based delay calculator 1604 to calculate signal propagation delays at the stages, and phase merger 1606 to merge phases at the nodes. A spatial module 1608 can provide infinite-depth path-based analyzer 1614 with estimated or predicted after-fabrication relative node depths and distances and/or the timing variation that can result therefrom.

The exhaustive path-based analyzer 1620 can be configured to perform EPBA, e.g., substantially contemporaneously with (e.g., in parallel with) IPBA performed by the infinite-depth path-based analyzer 1614. The exhaustive path-based analyzer 1620 and the infinite-depth path-based analyzer 1614 can be bidirectionally communicatively coupled so that the exhaustive path-based analyzer 1620 can provide EPBA-based endpoint convergence information to the infinite-depth path-based analyzer 1614, and so that the infinite-depth path-based analyzer 1614 can provide IPBA-based slack convergence guidance to the exhaustive path-based analyzer 1620. Thus, the functioning of each of the two analyzers 1614, 1620 can inform the functioning of the other of the two analyzers. For example, EPBA paths analyzed by the exhaustive path-based analyzer 1620 can be bounded by IPBA slacks computed by the infinite-depth path-based analyzer 1614, and infinite-depth path-based analyzer 1614 can be instructed to forego analysis of paths (including, e.g., merging of signals along paths) leading to endpoints already converged by the exhaustive path-based analyzer 1620.

The respective outputs of exhaustive path-based analyzer 1620 and infinite-depth path-based analyzer 1614 can include an IPBA-driven full-depth EPBA report generator 1626 configured to generate reports based on the EPBA done by the exhaustive path-based analyzer 1620 as informed by the IPBA done by the infinite-depth path-based analyzer 1614. The report generator 1626 can, for example, provide information to an engineering change order (ECO) module 1622 for automated, assisted, or fully manual remedial revision of a simulated digital circuit design to address timing violations, and/or to a signoff reporting module 1624 to generate human- or machine-readable reports indicating timing violations in the analyzed digital circuit design as discovered by analyzer 1600 (and, particularly, as not eliminated from consideration as potentially violating by the reduced-pessimism IPBA performed by infinite-depth path-based analyzer 1614). Path enumerator 1616 enumerates paths for reporting. In conventional PBA, first, a timing path is enumerated based upon GBA, and then PBA is performed on stages present in this path. In IPBA, however, it is other way around: first, timing is propagated on all design stages in the form of phases, and once worst IPBA timing is propagated, worst paths are enumerated based on stages that lead to worst timing. FIG. 2 relates to the conventional PBA process. FIG. 16 shows that path enumerator 1616 is invoked after IPBA is performed by analyzer 1614. Exhaustive path-based analyzer 1620 can include its own path enumeration functionality (not shown in FIG. 16) to facilitate EPBA path peeling.

Figure 17A:
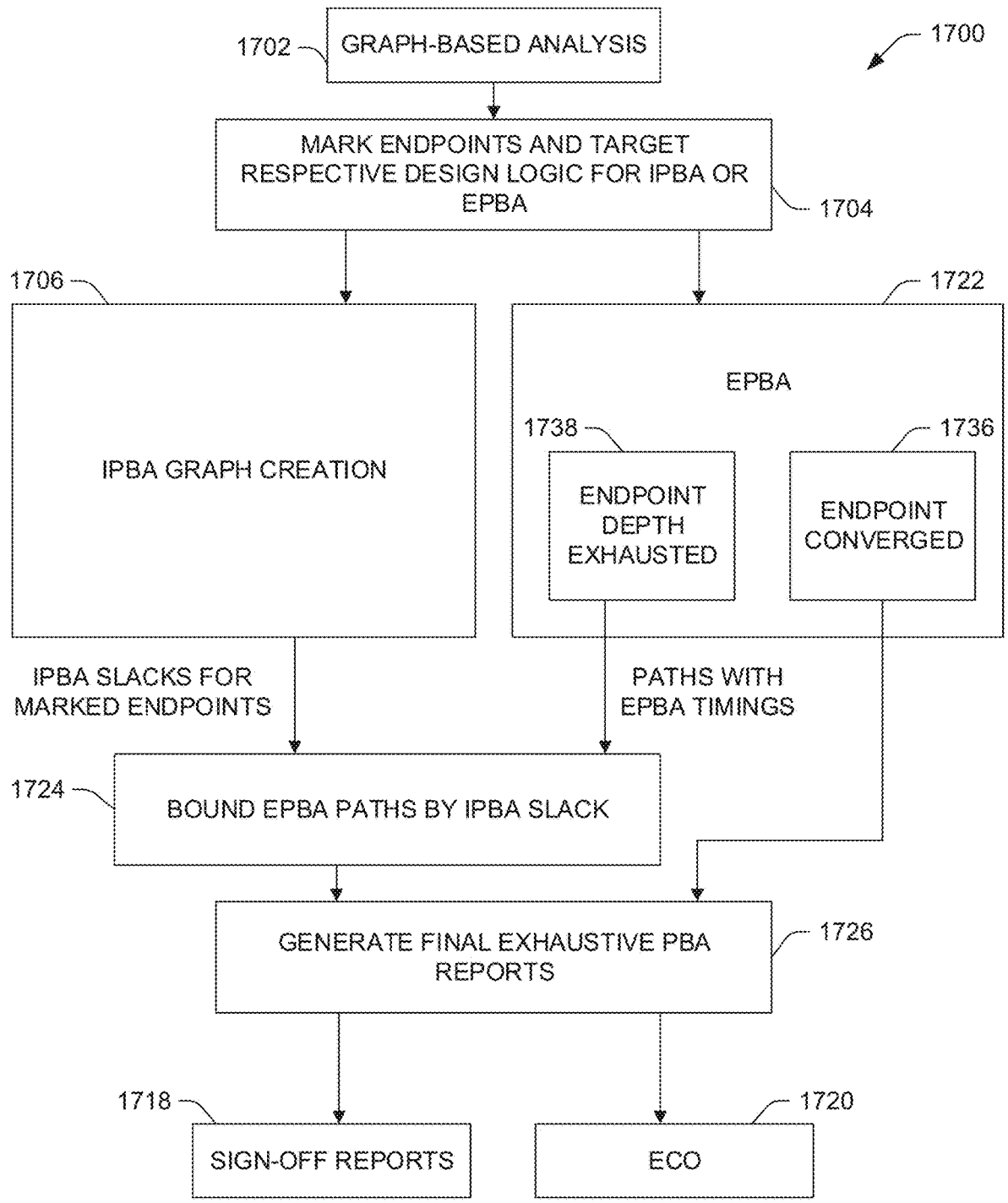
FIGS. 17A-17C provide a flowchart illustrating an example static timing analysis method using IPBA-driven full-depth EPBA, including EPBA and IPBA graph creation, such that endpoint-depth-exhausted EPBA paths are bounded by IPBA slacks.

FIG. 17A illustrates a static timing analysis method 1700 that uses IPBA-driven full-depth EPBA, in which both IPBA graph creation 1706 and EPBA 1722 are selectively used to analyze a digital circuit design for timing violations. GBA 1702 can be performed to provide a GBA-violating zone. Endpoints in the digital circuit design can be marked and respective logic in the digital circuit design can be targeted 1704 for analysis with IPBA 1706 or EPBA 1722. In some examples, the IPBA and the EPBA are performed in parallel, contemporaneously with each other, e.g., using multiple processors. The IPBA 1706, which can be performed, for example, by the infinite-depth path-based analyzer 1614 of FIG. 16, results in IPBA slacks for marked endpoints. The EPBA 1722 can be performed, for example, by exhaustive path-based analyzer 1620 of FIG. 16. For some endpoints in a timing graph, convergence 1736 will be attained by EPBA 1722 within timeout constraints and without exhausting endpoint depth. Such endpoints are thus EPBA-analyzed to full depth and final exhaustive PBA reports can be generated 1726 based on these full-depth EPBA-analyzed endpoints. For those endpoints that are not fully analyzed, e.g., for which the endpoint depth is exhausted 1738, the corresponding EPBA paths can be bounded 1724 by IPBA slack as computed in the IPBA graph creation 1706. Final exhaustive PBA reports can then be generated 1726 based on the IPBA-slack-bounded EPBA paths and those paths that were successfully converged using EPBA alone. Sign-off reports can then be created 1718, e.g., by signoff reporting module 1624 of FIG. 16, and/or engineering changes can be ordered 1720, e.g., by ECO module 1622 of FIG. 16, to modify the circuit design (which remedial modification can be followed by re-analysis), based on the final exhaustive PBA reports so generated 1726, e.g., by report generator 1626 of FIG. 16.

Figure 17B:
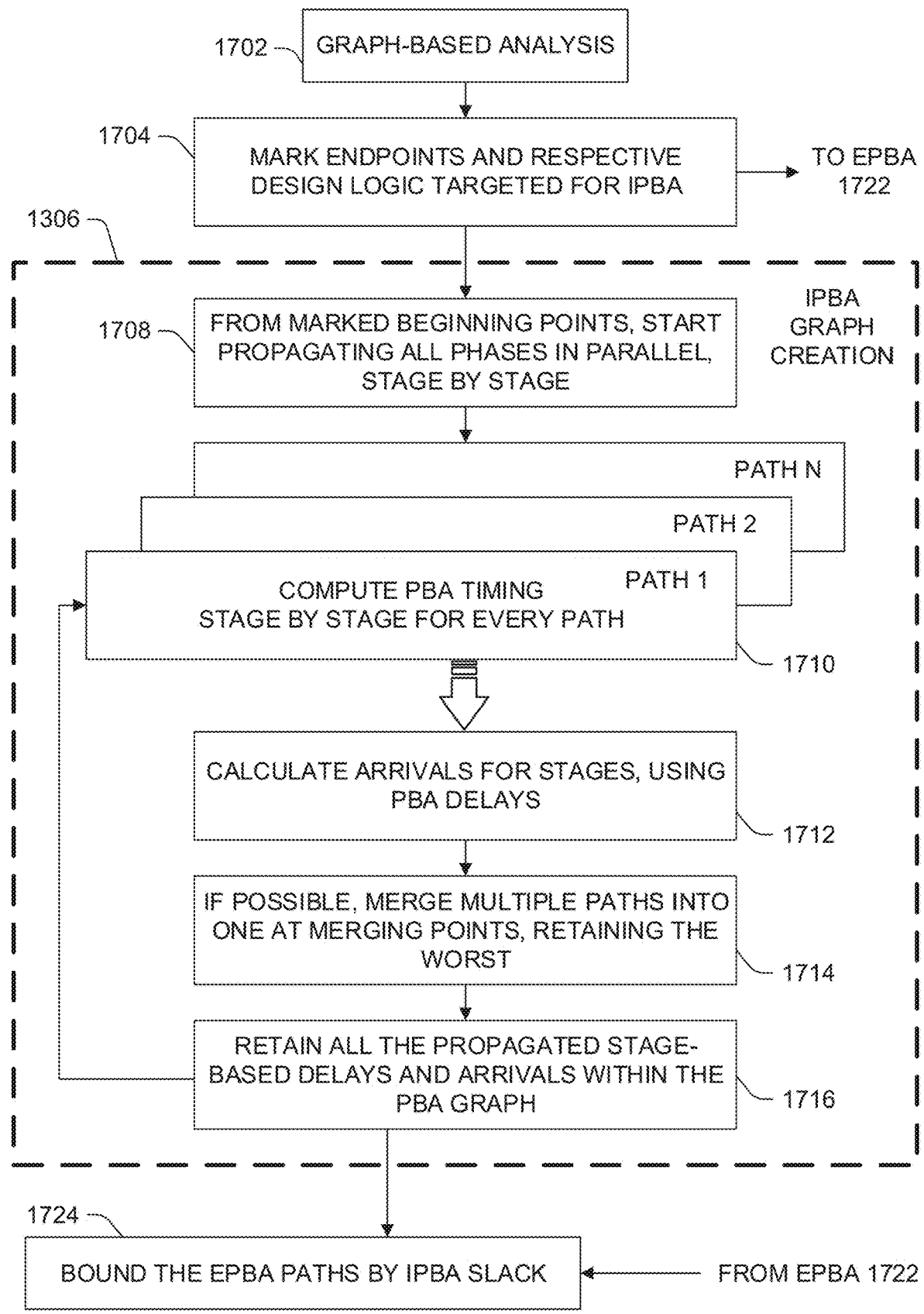

As shown in greater detail in FIG. 17B, IPBA graph creation 1706 includes slotting nodes in a timing graph into stages and propagating 1708 all phases in parallel, stage-by-by-stage, starting from marked begin points in a graph of the targeted logic. For all the paths 1710, paths 1 through N, the PBA timing is computed stage by stage (as opposed to path by path) using BFS graph traversal. Using computed PBA delays, signal arrival times are calculated 1712 for stages, e.g., by feeding the stages with PBA delays to a timer such as timer 1602 of FIG. 16 for calculation of signal arrival times. Where possible, multiple phases are merged 1714 at merging points, retaining the worst. Merging is considered "possible" where propagated values from one phase dominate propagated values from another phase for all relevant times, as described above. All the propagated stage-based delays and arrivals are retained 1716 within the PBA graph. Operations 1712, 1714, 1716 are re-iterated for each stage.

Figure 17C:
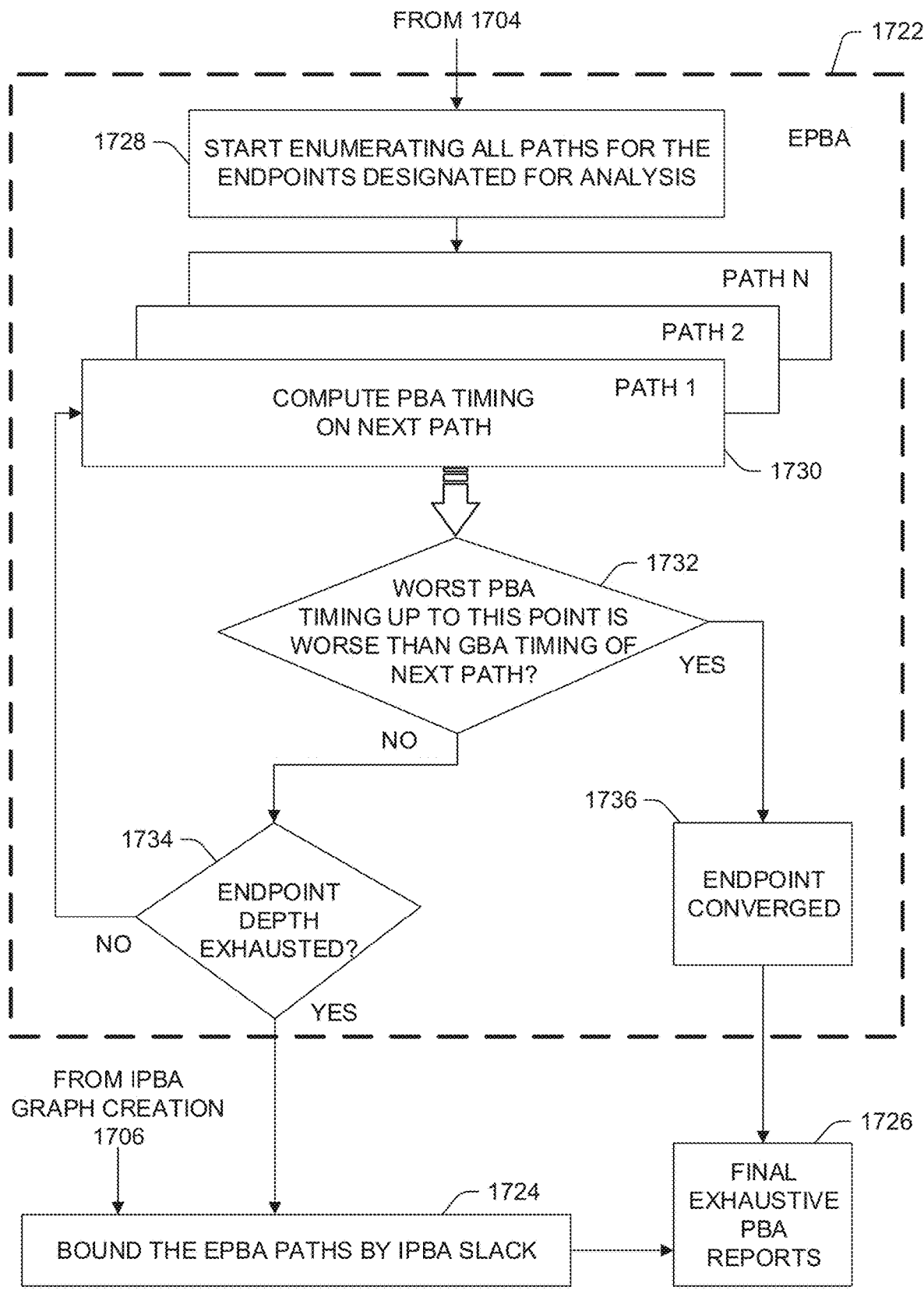

FIG. 17C shows the modified EPBA process 1722 of the IPBA-driven full-depth EPBA method 1700. Having received endpoints and logic targeted 1704 for analysis, EPBA 1722 starts enumerating 1728 all paths for the endpoints marked up for analysis, traversing the graph with DFS. Proceeding endpoint by endpoint (in some examples endpoints can be analyzed in parallel), paths are peeled from the design in non-increasing order of criticality. EPBA 1722 runs path-by-path, computing 1730 PBA timing on each path, without any intermediary merging of signals, as is done in IPBA. For each marked GBA-violating endpoint, after analyzing a path, the EPBA 1722 checks 1732 whether the worst PBA timing computed up to the present point in the analysis 1722 is worse than the GBA timing of the next path to be analyzed. If so, then the endpoint can be declared 1736 to be converged, and is provided for reporting 1726. If not, then the EPBA 1722 checks 1734 whether the endpoint depth has been exhausted for the endpoint currently being analyzed. The endpoint depth can be exhausted either if all the paths leading to an endpoint have been analyzed, or if the defined maximum depth has been reached, that is, if the number of paths analyzed for an endpoint is already equal to a defined value limiting the depth of the EPBA analysis for each endpoint. If the endpoint depth has not been exhausted, then the EPBA 1722 continues to compute 1730 the PBA timing on the next peeled path. If the endpoint depth has been exhausted, then the computed EPBA paths are bounded 1726 by the IPBA slack as determined from the IPBA graph creation 1706. The worst IPBA slack is reported 1726 as the EPBA result for the endpoint and the worst path computed by EPBA 1722 up to the point of exhaustion for the endpoint is reported as the worst path. For Nworst>1 reporting, a second-worst path, a third-worst path, etc., can also be reported, from among EPBA-analyzed paths.

The portions of a digital circuit design that are analyzed using IPBA-driven full-depth EPBA can, in some examples, consist of an entire GBA-violating zone, or, in other examples, a subset of paths within the GBA-violating zone. In still other examples, the portions of a digital circuit design that are analyzed using IPBA-driven full-depth EPBA can consist of the entire GBA-violating zone, plus additional marked paths or nodes. In yet other examples, the portions of a digital circuit design that are analyzed using IPBA-driven full-depth EPBA can partially overlap with the GBA-violating zone, including some paths in the GBA-violating zone, excluding others, and additionally including other marked paths or nodes. The portions of a circuit design marked for IPBA-driven full-depth EPBA can be referred to as the "critical region." Such portions can be so marked either manually by a user, or using automated marking criteria, or some combination of both. For example, critical region marking can be user-tunable based upon a maximum slack value given with a PBA command. This maximum slack value can, for example, be set to zero by default.

For example, a design may consist of a number of nodes, but not necessarily all nodes may be candidate nodes for PBA analysis. For example, a user may prefer to invoke PBA analysis on only those nodes having a violating slack (a slack less than zero). The designated maximum slack limit can be user tunable, such that an analysis tool is configured mark the candidate PBA nodes based on a user-defined slack value.

For example, a user can specify "-max_slack 0" (e.g., via a command-line command) to configure the analysis tool to perform PBA analysis (e.g., IPBA-driven full-depth EPBA analysis) on all nodes with a GBA slack less than zero, that is, to the entire GBA-violating zone. By contrast, a user can specify "-max_slack 0.010" to configure the analysis tool to perform PBA analysis on all nodes having a GBA slack of less than ten picoseconds. The analysis tool can thus define the critical region based upon the slack limit specified by user. If no maximum slack is specified, the analysis tool can, for example, assume the maximum slack value to be zero.

Figure 18A:
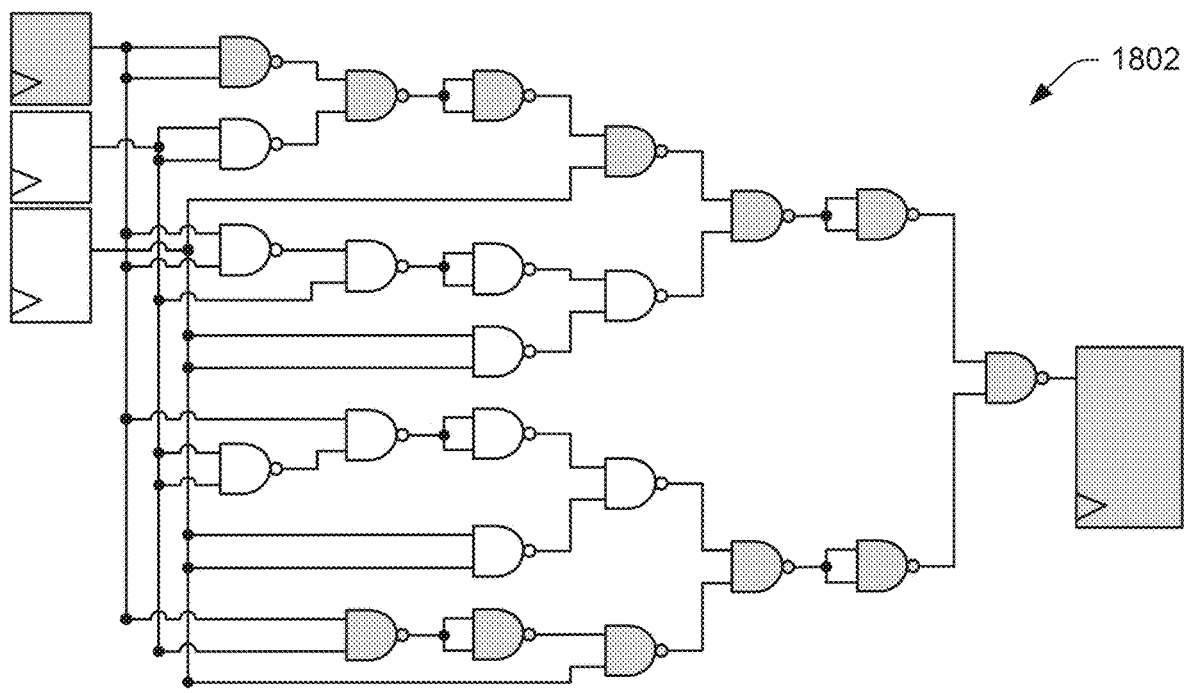
FIGS. 18A and 18B are example circuit diagrams illustrating different critical regions within a portion of a circuit design.
Figure 18B:
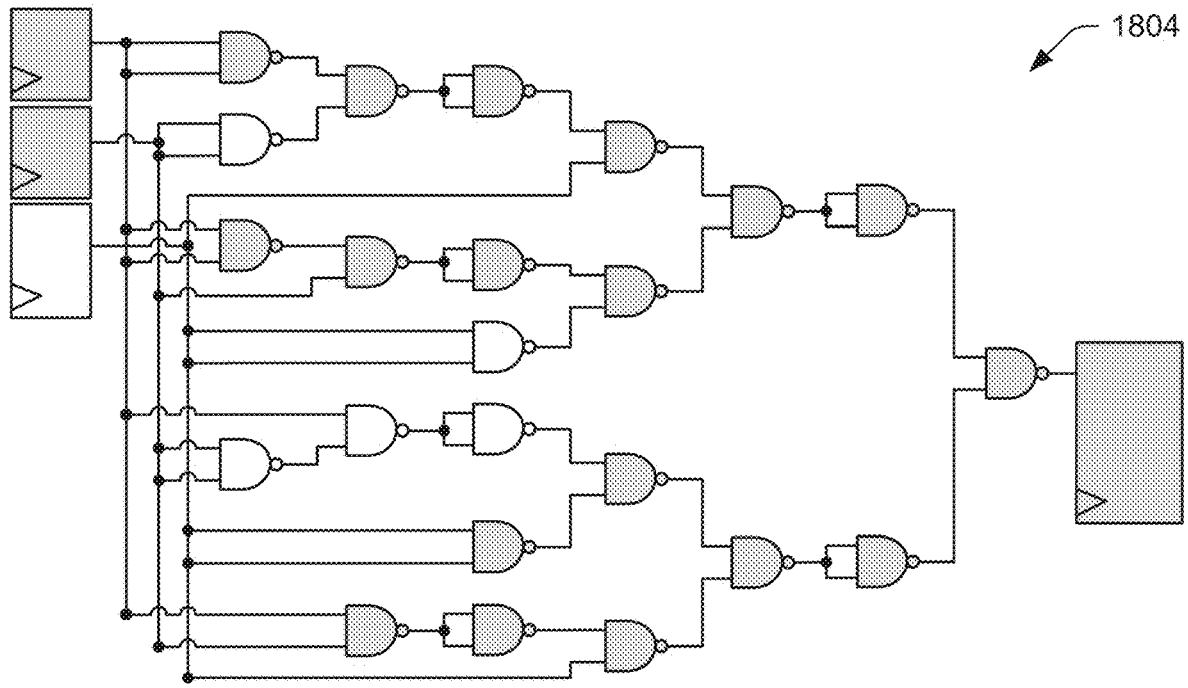

To illustrate critical region marking, FIGS. 18A and 18B show example circuit diagrams 1802, 1804 having different critical regions within a portion of a circuit design. The critical region is shown in each of FIGS. 18A and 18B as shaded gates between select shaded begin points and a single shaded endpoint. Shaded devices thus indicate the nodes for which computed GBA slacks are less than the designated maximum slack value, and will therefore be covered by PBA analysis. The critical region, as shaded, includes begin points, endpoints, and internal nodes. IPBA can, for example, be restricted to only nodes within the critical region. FIG. 18A depicts an example case 1802 in which the maximum slack value is set to zero. Thus, in FIG. 18A, the shaded portion of the circuit represents the entire GBA-violating zone. FIG. 18B depicts an example case 1804, for the same circuit portion, in which the maximum slack value is set to ten picoseconds. FIG. 18B thus depicts a case in which a user may desire to include a slightly positive-slack portion of the circuit design within the critical region, e.g., by specifying the slack value with a command option such as "-max_slack 0.010" to configure the critical region to include all nodes from—infinity to +10 ps. Setting the maximum slack value to a positive nonzero value in this way expands the critical region beyond the GBA-violating zone because it includes all negative slack nodes and also positive slack nodes within the specified limit. Specifying a negative maximum slack value will restrict the number of candidate nodes in the critical region. In some examples, nodes and/or paths may also be manually marked for analysis, e.g., using a graphical user interface.

In systems and methods employing conventional EPBA alone, when the endpoint depth is exhausted, leaving paths unanalyzed by the EPBA, it remains unknown whether or not the worst path is among the analyzed paths. Conventional EPBA is therefore not able to guarantee that the worst slack among the analyzed paths is the actual worst slack at the analyzed endpoint. By contrast, in IPBA-driven full-depth EPBA, unconverged endpoints can be reported by the worst path derived from the EPBA with the slack reported by IPBA. In contrast to systems using IPBA alone, Nworst>1 reporting is also possible in IPBA-driven full-depth EPBA, because in IPBA-driven full-depth EPBA, paths are peeled and analyzed individually using EPBA.

IPBA-driven full-depth EPBA provides a number of benefits and advantages over IPBA. IPBA works by slotting nodes on a timing graph representative of a circuit design into stages, propagating the PBA timing of all paths together in parallel using a BFS traversal technique, and merging signals at or downstream of points where paths join in the graph, to compute the worst PBA slack at every endpoint. As a first advantage over IPBA, IPBA-driven full-depth EPBA eliminates much of the inbuilt pessimism of IPBA, which is due in IPBA to the merging of signals at intermediate points.

This inbuilt pessimism of IPBA can be manifest even where multiple paths connect a single begin point to an endpoint. IPBA-driven full-depth EPBA, by contrast, permits exact PBA slack to be reported for all endpoints but those that would not ordinarily be converged with conventional EPBA.

As a second advantage over IPBA, IPBA-driven full-depth EPBA offers reduced pessimism for "-from -to" reporting, in which begin points as well as endpoints are specified. In IPBA, timing for an endpoint might change based upon which (non-worst) begin points are included in analysis. For example, the IPBA timing reported as a result of the following two commands can differ, even though, for both commands, the worst path timing is originates from begin point A only:

report_timing—from A -to D -retime . . . -retime_mode exhaustive report_timing—from {A,B }-to D -retime . . . -retime_mode exhaustive This timing reporting difference results because IPBA uses BFS-based propagation and computing timings depend upon merging done as signals are propagated through the analyzed logic. As the propagation changes with changed begin points, the final reported slack might change in a pessimistic direction in accordance with the merging done at intermedia nodes of the graph. The use of IPBA-driven full-depth EPBA produces reported results more consistent with those reported by conventional EPBA, and will not report different worst PBA timing for the same endpoint.

As a third advantage over IPBA, IPBA-driven full-depth EPBA is capable of providing Nworst>1 reporting. IPBA alone can only propagate and report the single worst PBA timing at each GB A-violating endpoint, and does not have the ability to report more than one path per endpoint. Thus, IPBA alone is capable only of Nworst=1 reporting. Nworst>1 reporting is desirable to permit fixing violating logic suspected in multiple paths to a single GBA-violating endpoint.

As a fourth advantage over IPBA, IPBA-driven full-depth EPBA can mitigate occasional optimism reported by IPBA, in which a reported worst slack is less than the actual worst slack, as would be reported by EPBA (given endpoint convergence). Such optimism can arise as a result of IPBA signal merging due, for example, to issues with waveform width or statistical distributions of delays. As an example of waveform width optimism, a first, less worse signal may be propagated at IPBA pruning/merging in preference over propagation of a second, actually worse signal when waveform analysis of closely resembling waveforms from the two signals misidentifies the waveform of the first signal as the worst of the two. A very slightly optimistic arrival time may be reported as a consequence of the IPBA waveform analysis. As a result of statistical distribution of delays optimism, first signal and second signals to be merged may have respective first and second delay distributions. When merging the first and second distributions, a third distribution can be created out of the first and second distributions. A pessimistic third (merged) distribution would cleanly overlap the larger values of the first and second distributions at any point in time. However, implemented methods of generating merged distributions may generate merged distributions that do not cleanly overlap the first and second distributions at all points in time. Such a merged distribution can be slightly inaccurate and may result in slightly optimistic reporting of delay. Because IPBA-driven full-depth EPBA reports EPBA results that are only bounded by potentially optimistic IPBA results, occasional IPBA optimism is mitigated.

As a fifth advantage over IPBA, IPBA-driven full-depth EPBA can reduce retimes by avoiding high IPBA runtimes in instances in which IPBA runtimes exceed EPBA runtimes, for example, in hold-mode analysis. From a runtime perspective, IPBA suits setup-mode exhaustive analysis, because in setup mode, generally, longer paths ultimately turn out to be worst. In hold mode, however, generally, shorter paths ultimately turn out to be the worst. Since the BFS graph traversal of IPBA analysis propagates the timing of all paths together in one go, IPBA can expend excessive, unnecessary runtime on longer paths, whereas conventional EPBA could have completed the analysis sooner in such cases by converging earlier in the analysis process, e.g., after analyzing only one or a few short paths and discarding the rest of the paths to a violating endpoint from analysis as too long to be the worst in hold mode. Accordingly, IPBA-driven full-depth EPBA is useful in hold mode and setup mode alike, whereas IPBA is in many cases too slow to be useful in hold mode.

IPBA-driven full-depth EPBA addresses each of the above issues inherent in IPBA. The systems and methods of the present application, configured to employ IPBA-driven full-depth EPBA, can thus enable circuit designers and test engineers to use a single STA simulation approach for sign-off purposes while also avoiding the complexity and limitations inherent in the use of conventional EPBA alone.

What have been described above are examples of the invention. It is, of course, not possible to describe every conceivable combination of components or methodologies for purposes of describing the invention, but one of ordinary skill in the art will recognize that many further combinations and permutations of the invention are possible. Accordingly, the invention is intended to embrace all such alterations, modifications, and variations that fall within the scope of this application, including the appended claims. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. A method for detecting timing violations in a circuit design, the method comprising:

executing an exhaustive path-based analysis (EPBA) with at least one processor coupled to a memory storing physical implementation data for the circuit design, the circuit design having a plurality of timing paths, each path proceeding between a begin point for the path and an endpoint for the path, and each path having at least one node thereon, the executing the EPBA to compute timings along EPBA paths comprising at least a subset of the timing paths in the circuit design;

bounding at least a subset of the EPBA paths, for which the EPBA paths lead to endpoints not converged by the EPBA, by slacks computed by an infinite-depth path-based analysis (IPBA); and reporting results of the EPBA, including arrival times at endpoints analyzed by the EPBA and, at least for each such endpoint not converged by the EPBA, at least one worst EPBA path leading to the corresponding endpoint, as bounded by the IPBA slacks, wherein the IPBA comprises:

slotting nodes of a designated subset of the plurality of timing paths into stages;

propagating a plurality of signals through the nodes of the plurality of timing paths stage-by-stage, in parallel, and for at least a respective one of the stages:
  computing path-based static timing analysis (PBA) timing characteristic values for each signal, of the plurality of signals, arriving at a respective node in the respective stage; and
  merging corresponding first and second timing characteristic values of the computed timing characteristic values by propagating from the respective node, to a subsequent node in a path shared by the respective node and the subsequent node, either
    (a) the first timing characteristic value and not the corresponding second timing characteristic value, or
    (b) a merged timing characteristic value computed based on the first and second timing characteristic values.

2. The method of claim 1, wherein the merging is based on the respective node converging multiple paths of the subset of the plurality of timing paths, and further based on a determination that the first timing characteristic value propagated to the respective node from a first of the multiple paths dominates the corresponding second timing characteristic value propagated to the respective node from a second of the multiple paths.

3. The method of claim 1, wherein the stage-by-stage propagation of the plurality of signals uses a breadth-first search (BFS) graph traversal technique.

4. The method of claim 1, wherein the first and second timing characteristic values are merged based on the second timing characteristic falling within a zone of the first timing characteristic, the zone being a multidimensional region surrounding the first timing characteristic in a multidimensional space, the zone being defined by positive and negative thresholds for at least mean, standard deviation, and skewness dimensions of the first timing characteristic value.

5. The method of claim 1, further comprising, prior to the executing the EPBA, executing a graph-based static timing analysis (GBA) with the at least one processor or at least one different processor to identify a subset of the circuit design defining a GBA-violating zone comprising paths having potential timing violations as determined by the GBA, and wherein the designated subset of the plurality of timing paths for which the EPBA is performed is limited to a defined critical region of the circuit design having overlap with the GBA-violating zone.

6. The method of claim 5, wherein the EPBA comprises computing path-based static timing analysis (PBA) timing characteristic values for signals along an enumerated path of the EPBA paths, the enumerated path having an endpoint, and wherein bounding of the enumerated path by an IPBA slack is based on:
  determining that worst PBA timing computed by the EPBA from among PBA timings computed for all paths leading to the endpoint of the enumerated path, as computed by the EPBA, is not worse than a GBA timing, computed by the GBA, of a next enumerated path after the enumerated path; and
  determining that a specified endpoint depth for the endpoint of the enumerated path has been exhausted by the EPBA, the endpoint depth representing a number of enumerated paths leading to the endpoint of the enumerated path that have been analyzed by the EPBA.

7. The method of claim 5, wherein the critical region is defined by a user input specifying a maximum slack value, a positive maximum slack value expanding the critical region to include the entire GBA-violating zone and timing paths outside the GBA-violating zone, and a negative maximum slack value restricting the critical region to a subset of the timing paths of the GBA-violating zone.

8. The method of claim 1, wherein the EPBA and the IPBA are executed substantially contemporaneously, in parallel with each other.

9. The method of claim 1, further comprising, in a hold-mode static timing analysis, the IPBA providing slack convergence guidance to the EPBA, and the EPBA providing endpoint convergence information to the IPBA.

10. A system for detecting timing violations in a circuit design, the system comprising:
  at least one processor coupled to a memory storing physical implementation data for a circuit design having a plurality of timing paths, each path proceeding between a begin point for the path and an endpoint for the path, and each path having at least one node thereon;
  an exhaustive path-based static timing analyzer configured to perform exhaustive path-based static timing analysis (EPBA) by computing timings along EPBA paths comprising at least a subset of the timing paths in the circuit design;
  an infinite-depth path-based static timing analyzer configured to perform infinite-depth path-based static timing analysis (IPBA) of the circuit design, and configured to bound at least a subset of the EPBA paths, for which the EPBA paths lead to endpoints not converged by the exhaustive path-based static timing analyzer, by slacks computed by the infinite-depth path-based static timing analyzer; and
  a report generator configured to report results of the EPBA, including arrival times at endpoints analyzed by the exhaustive path-based static timing analyzer and, at least for each such endpoint not converged by the EPBA, at least one worst EPBA path leading to the corresponding endpoint, as bounded by the IPBA slacks,
  wherein the IPBA comprises:
    slotting nodes of a designated subset of the plurality of timing paths into stages;
    propagating a plurality of signals through the nodes of the plurality of timing paths stage-by-stage, in parallel, and for at least a respective one of the stages:
      computing path-based static timing analysis (PBA) timing characteristic values for each signal, of the plurality of signals, arriving at a respective node in the respective stage; and
      merging corresponding first and second timing characteristic values of the computed timing characteristic values by propagating from the respective node, to a subsequent node in a path shared by the respective node and the subsequent node, either
        (a) the first timing characteristic value and not the corresponding second timing characteristic value, or
        (b) a merged timing characteristic value computed based on the first and second timing characteristic values.

11. The system of claim 10, wherein the merging is based on the respective node converging multiple paths of the subset of the plurality of timing paths, and further based on a determination that the first timing characteristic value propagated to the respective node from a first of the multiple paths dominates the corresponding second timing characteristic value propagated to the respective node from a second of the multiple paths.

12. The system of claim 10, wherein the infinite-depth path-based static timing analyzer is configured to perform the stage-by-stage propagation of the plurality of signals using breadth-first search (BFS) graph traversal.

13. The system of claim 10, wherein the infinite-depth path-based static timing analyzer is configured to perform the merging of the first and second timing characteristic values based on the second timing characteristic falling within a zone of the first timing characteristic, the zone being a multidimensional region surrounding the first timing characteristic in a multidimensional space, the zone being defined by positive and negative thresholds for at least mean, standard deviation, and skewness dimensions of the first timing characteristic value.

14. The system of claim 10, further comprising a graph-based static timing analyzer configured to execute, prior to the executing the EPBA or the IPBA, a graph-based static timing analysis (GBA) to identify a subset of the circuit design defining a GBA-violating zone comprising paths having potential timing violations as determined by the GBA, and wherein the exhaustive path-based static timing analyzer and the infinite-depth path-based static timing analyzer are configured to perform EPBA and IPBA, respectively, only on a defined critical region of the circuit design having overlap with the subset of the plurality of timing paths in the GBA-violating zone.

15. The system of claim 14, wherein the exhaustive path-based static timing analyzer is configured to compute path-based static timing analysis (PBA) timing characteristic values for signals along an enumerated path of the EPBA paths, the enumerated path having an endpoint, and wherein the system is configured to bound the enumerated path by an IPBA slack based on:
 determining that worst PBA timing computed by the exhaustive path-based static timing analyzer from among PBA timings computed for all paths leading to the endpoint of the enumerated path, as computed by the exhaustive path-based static timing analyzer, is not worse than a GBA timing, computed by the graph-based static timing analyzer, of a next enumerated path after the enumerated path; and
 determining that a specified endpoint depth for the endpoint of the enumerated path has been exhausted by the exhaustive path-based static timing analyzer, the endpoint depth representing a number of enumerated paths leading to the endpoint of the enumerated path that have been analyzed by the exhaustive path-based static timing analyzer.

16. The system of claim 14, wherein the critical region is defined by a user input specifying a maximum slack value, a positive maximum slack value expanding the critical region to timing paths outside the GBA-violating zone, and a negative maximum slack value restricting the critical region to a subset of the timing paths of the GBA-violating zone.

17. A non-transitory computer-readable medium storing instructions that, when executed on one or more processors, substantially contemporaneously perform both exhaustive path-based static timing analysis (EPBA) and infinite-depth path-based static timing analysis (IPBA) to analyze physical implementation data for a circuit design having a plurality of timing paths, each path proceeding between a begin point for the path and an endpoint for the path, and each path having at least one node thereon, the EPBA to compute timings along EPBA paths comprising at least a subset of the timing paths in the circuit design, wherein:
 at least a subset of the EPBA paths, for which the EPBA paths lead to endpoints not converged by the EPBA, are bounded, according to the instructions, by slacks computed by the IPBA; and
 results of the EPBA are reported according to the instructions, the results including arrival times at endpoints analyzed by the EPBA and, at least for each such endpoint not converged by the EPBA, at least one worst EPBA path leading to the corresponding endpoint, as bounded by the IPBA slacks,
 wherein the IPBA comprises:
  slotting nodes of a designated subset of the plurality of timing paths into stages;
  propagating a plurality of signals through the nodes of the plurality of timing paths stage-by-stage, in parallel, and for at least a respective one of the stages:
   computing path-based static timing analysis (PBA) timing characteristic values for each signal, of the plurality of signals, arriving at a respective node in the respective stage; and
   merging corresponding first and second timing characteristic values of the computed timing characteristic values by propagating from the respective node, to a subsequent node in a path shared by the respective node and the subsequent node, either
   (a) the first timing characteristic value and not the corresponding second timing characteristic value, or
   (b) a merged timing characteristic value computed based on the first and second timing characteristic values.

18. The computer-readable medium of claim 17, wherein the instructions are configured such that, in a hold-mode static timing analysis, the IPBA provides slack convergence guidance to the EPBA, and the EPBA provides endpoint convergence information to the IPBA.

* * * * *